US005764859A

United States Patent [19]
Kim et al.

[11] Patent Number: 5,764,859
[45] Date of Patent: Jun. 9, 1998

[54] APPARATUS FOR NONDESTRUCTIVE ON-LINE INSPECTION OF ELECTRIC RESISTANCE WELDING STATES AND A METHOD THEREOF

[75] Inventors: Sang Hee Kim, Seongnam; Jin Oh Kwon, Gumi, both of Rep. of Korea

[73] Assignee: Orion Metal Company Ltd., Gumi, Rep. of Korea

[21] Appl. No.: 537,507

[22] Filed: Oct. 2, 1995

[30] Foreign Application Priority Data

Oct. 1, 1994 [KR] Rep. of Korea .............. 94-25353
Sep. 12, 1995 [KR] Rep. of Korea .............. 95-30243

[51] Int. Cl.$^6$ .............................................. G06F 15/18
[52] U.S. Cl. .............................................. 395/22; 219/109
[58] Field of Search .................. 395/22, 97; 219/109, 219/110, 117.1, 497

[56] References Cited

U.S. PATENT DOCUMENTS

| | | | |
|---|---|---|---|
| 3,746,829 | 7/1973 | Petzold | 219/110 |
| 4,459,456 | 7/1984 | Jurek et al. | 219/110 |
| 4,521,665 | 6/1985 | Nakata et al. | 219/117.1 |
| 4,542,277 | 9/1985 | Cecil | 219/109 |
| 4,973,813 | 11/1990 | Mitchell | 219/109 |
| 5,021,625 | 6/1991 | Destefan et al. | 219/109 |
| 5,130,518 | 7/1992 | Merle | 219/497 |
| 5,194,709 | 3/1993 | Ichikawa et al. | 219/109 |
| 5,298,711 | 3/1994 | Leon | 219/110 |
| 5,343,011 | 8/1994 | Fujii et al. | 219/109 |
| 5,397,872 | 3/1995 | Baker et al. | 219/109 |
| 5,399,827 | 3/1995 | Fortmann | 219/109 |
| 5,436,422 | 7/1995 | Nishiwaki et al. | 219/110 |
| 5,450,315 | 9/1995 | Stefanski | 364/148 |
| 5,493,093 | 2/1996 | Cecil | 219/110 |

OTHER PUBLICATIONS

Quero et al., Neural network approach to weld quality monitoring, IECON 94, pp. 1287–1291, Sep. 9, 1994.
Javed et al., Neural networks based learning and adaptive control for manufacturing systems, Intelligent Robots and Systems 1991, pp. 242–246, 1991.
Gedeon et al, Measurement of Dynamic Electrical and Mechanical Properties of Resistance Spot Welds, S.A., Welding Research Supplement, Dec. 1987, pp. 378s–385s.

*Primary Examiner*—Tariq R. Hafiz
*Assistant Examiner*—Sanjiv Shah
*Attorney, Agent, or Firm*—IP Group of Pillsbury Madison & Sutro LLP

[57] ABSTRACT

Apparatus for inspecting an electric resistance welding state including a first electrode connected to a power source, a second electrode connected to another terminal of the power source, and a welding object interposed between the first and the second electrodes. A voltage waveform measuring system includes a first analog-to-digital converter for detecting voltage applied, during a welding process, to both ends of the welding object.

An electrode movement measuring system includes a sensor for detecting a change of a gap between the first and the second electrodes during the welding process, and a second analog-to-digital converter for receiving an output of the sensor.

A computer system which includes a neural network inspection system for receiving outputs from the voltage waveform measuring system and from the electrode movement measuring system is provided.

6 Claims, 22 Drawing Sheets

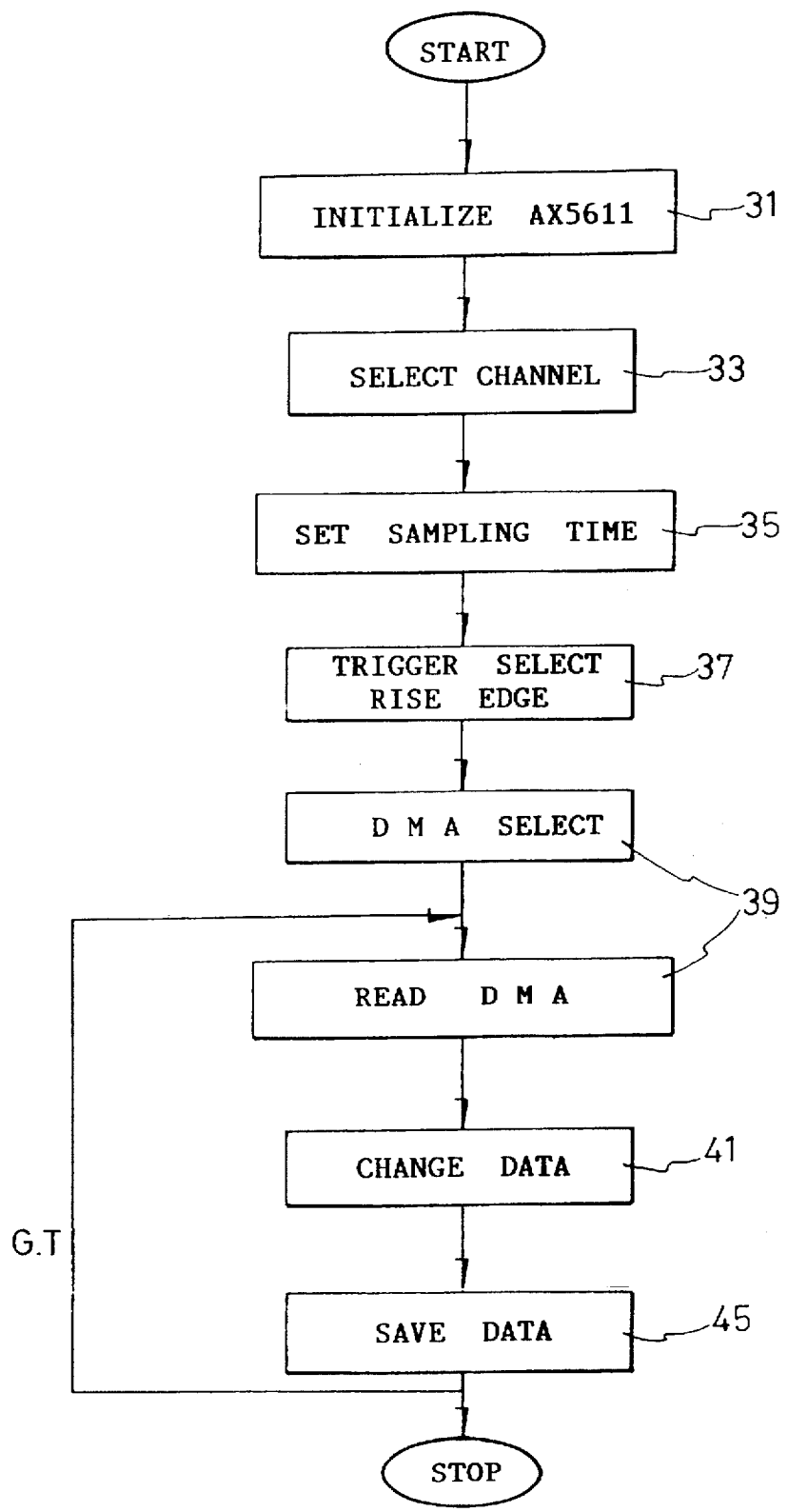

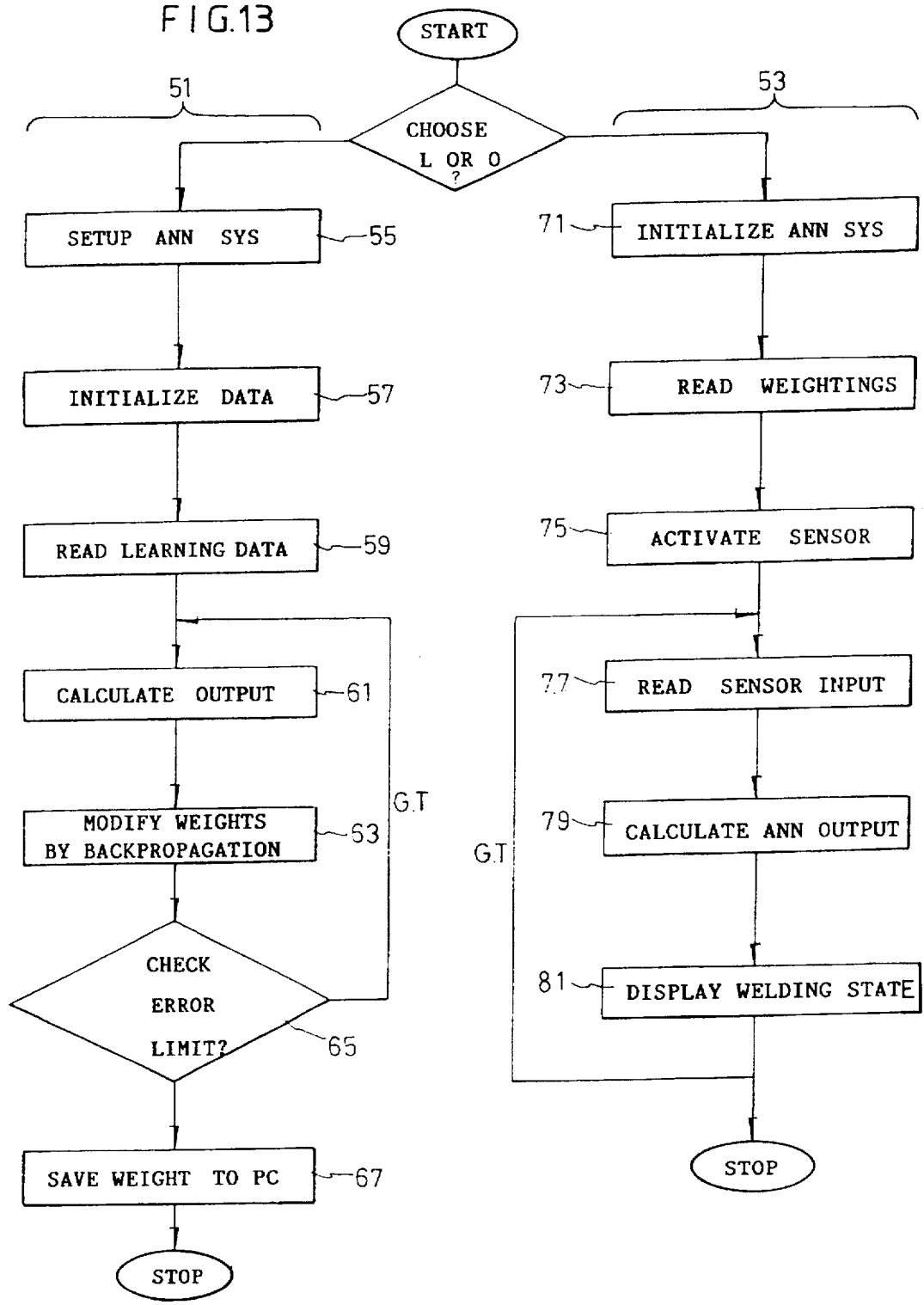

FIG. 14

| | INPUT #1 | INPUT #2 | INPUT #3 | INPUT #4 | INPUT #5 | INPUT #6 | INPUT #7 | INPUT #8 | INPUT #9 | INPUT #10 | INPUT #11 | INPUT #12 | INPUT #13 | INPUT #14 | INPUT #15 | INPUT #16 | INPUT #17 | INPUT #18 |
|---|---|---|---|---|---|---|---|---|---|---|---|---|---|---|---|---|---|---|
| 1 | 2.48 | 2.99 | 3.00 | 2.97 | 2.88 | 2.77 | 2.71 | 2.63 | 2.60 | 2.56 | 2.55 | 2.53 | 2.51 | 2.49 | 2.49 | 2.49 | 2.48 | 2.47 |
| 2 | 2.46 | 2.91 | 2.97 | 2.75 | 2.82 | 2.77 | 2.74 | 2.68 | 2.66 | 2.60 | 2.61 | 2.57 | 2.56 | 2.55 | 2.74 | 2.52 | 2.50 | 2.49 |
| 3 | 2.42 | 2.89 | 2.97 | 2.89 | 2.82 | 2.80 | 2.74 | 2.64 | 2.60 | 2.57 | 2.56 | 2.53 | 2.53 | 2.50 | 2.50 | 2.48 | 2.46 | 2.46 |
| 4 | 2.20 | 2.55 | 2.44 | 2.41 | 2.41 | 2.39 | 2.39 | 2.39 | 2.37 | 2.35 | 2.35 | 2.35 | 2.41 | 2.42 | 2.38 | 2.35 | 2.34 | 2.45 |
| 5 | 2.17 | 2.54 | 2.41 | 2.35 | 2.37 | 2.40 | 2.40 | 2.39 | 2.39 | 2.38 | 2.37 | 2.35 | 2.40 | 2.34 | 2.33 | 2.32 | 2.33 | 2.31 |
| 6 | 2.21 | 2.56 | 2.45 | 2.37 | 2.39 | 2.38 | 2.38 | 2.47 | 2.39 | 2.39 | 2.43 | 2.39 | 2.38 | 2.34 | 2.34 | 2.34 | 2.33 | 2.32 |
| 7 | 2.85 | 3.49 | 3.40 | 3.13 | 3.12 | 3.02 | 2.96 | 2.89 | 2.91 | 2.81 | 2.80 | 2.76 | 2.75 | 2.72 | 2.69 | 2.67 | 2.66 | 2.64 |
| 8 | 2.81 | 3.39 | 3.36 | 3.29 | 2.98 | 2.87 | 2.88 | 2.84 | 2.84 | 2.81 | 2.79 | 2.78 | 2.78 | 2.76 | 2.75 | 2.73 | 2.72 | 2.68 |
| 9 | 2.85 | 3.49 | 3.40 | 3.13 | 3.12 | 3.02 | 2.96 | 2.89 | 2.85 | 2.81 | 2.80 | 2.76 | 2.75 | 2.72 | 2.69 | 2.67 | 2.66 | 2.64 |

| OUTPUT #1 | OUTPUT #2 |
|---|---|
| 1 | 1 |
| 1 | 1 |
| 1 | 1 |
| 0 | 0 |
| 0 | 0 |
| 0 | 0 |
| 0 | 1 |
| 0 | 1 |
| 0 | 1 |

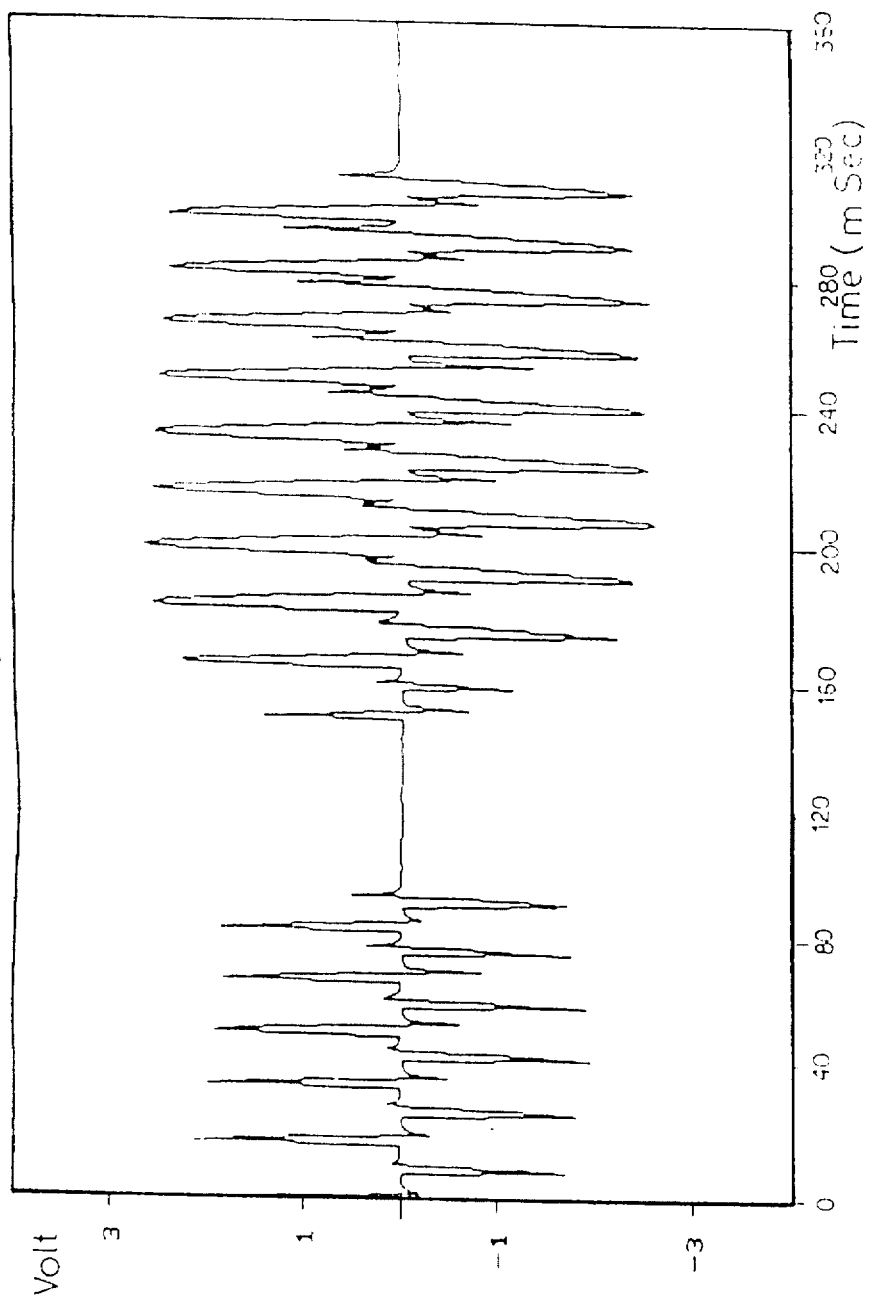

FIG. 15(B)

| TIME  | 1    | 2    | 3    | 4    | 5    |
|-------|------|------|------|------|------|
| 148.3 | 1.65 | 1.63 | 1.69 | 1.53 | 1.55 |
| 156.7 | 1.71 | 1.75 | 1.71 | 1.75 | 1.68 |
| 165.4 | 2.45 | 2.45 | 2.09 | 2.24 | 2.21 |
| 173.7 | 2.35 | 2.35 | 2.09 | 2.14 | 2.23 |
| 181.9 | 2.55 | 2.58 | 2.40 | 2.51 | 2.56 |
| 190.4 | 2.48 | 2.47 | 2.33 | 2.42 | 2.45 |
| 198.7 | 2.62 | 2.63 | 2.43 | 2.45 | 2.51 |
| 206.8 | 2.62 | 2.64 | 2.36 | 2.40 | 2.42 |
| 215.1 | 2.56 | 2.56 | 2.30 | 2.40 | 2.36 |
| 223.6 | 2.58 | 2.53 | 2.31 | 2.38 | 2.33 |
| 232.0 | 2.54 | 2.53 | 2.27 | 2.37 | 2.31 |
| 240.3 | 2.51 | 2.52 | 2.25 | 2.35 | 2.27 |
| 248.4 | 2.49 | 2.49 | 2.22 | 2.33 | 2.26 |
| 256.8 | 2.49 | 2.47 | 2.20 | 2.30 | 2.21 |
| 265.2 | 2.46 | 2.43 | 2.22 | 2.30 | 2.24 |
| 273.6 | 2.43 | 2.41 | 2.21 | 2.29 | 2.22 |
| 281.8 | 2.42 | 2.42 | 2.18 | 2.28 | 2.21 |
| 290.2 | 2.45 | 2.40 | 2.15 | 2.24 | 2.17 |
| 298.5 | 2.39 | 2.37 | 2.18 | 2.26 | 2.21 |
| 306.9 | 2.37 | 2.34 | 2.17 | 2.25 | 2.19 |

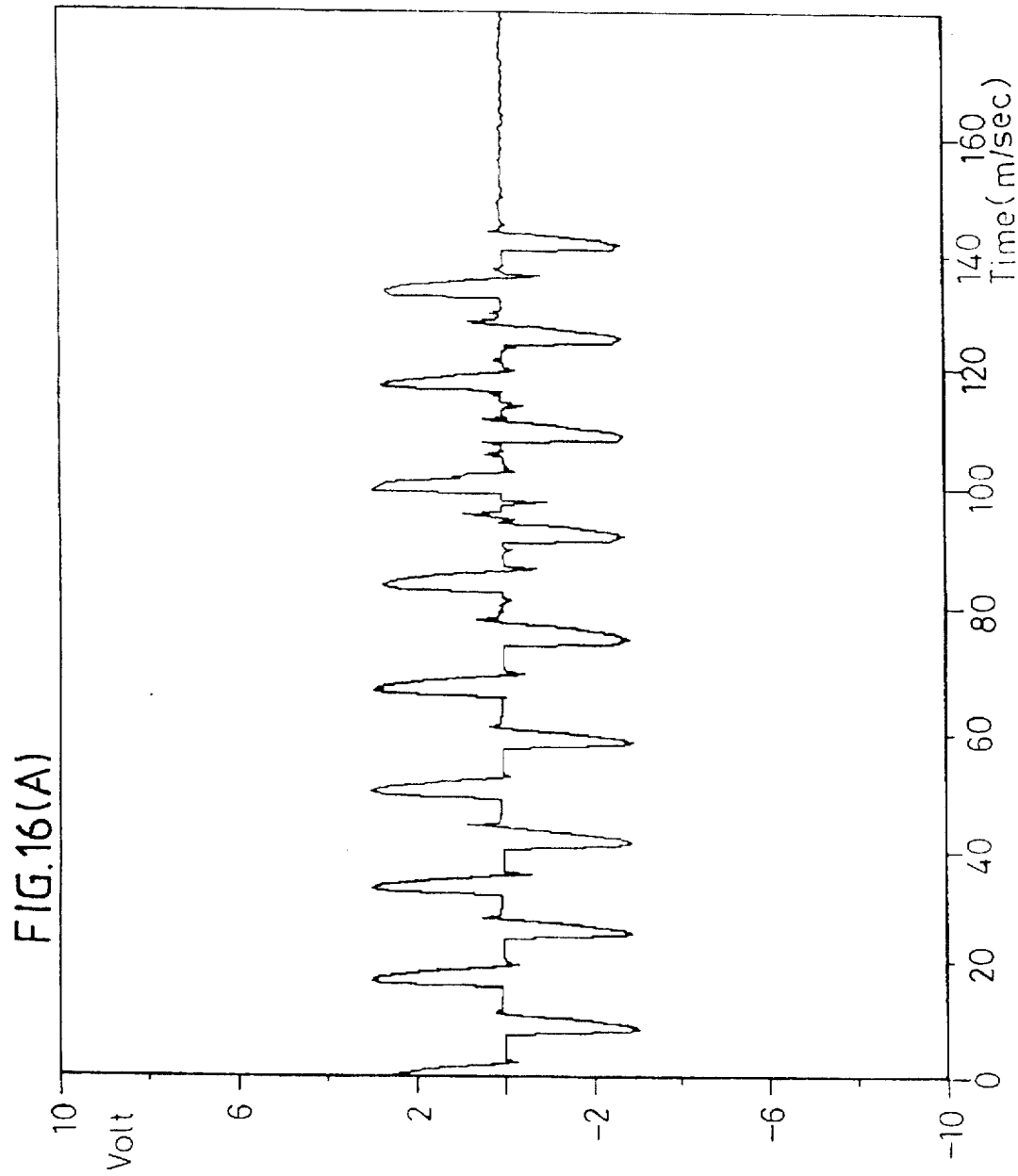

FIG.16(B)

| Time | 1 | 2 | 3 | 4 | 5 | 6 |
|---|---|---|---|---|---|---|
| 0.2 | 2.48 | 2.46 | 2.2 | 2.17 | 2.85 | 2.81 |
| 8.3 | 2.99 | 2.91 | 2.55 | 2.54 | 3.49 | 3.39 |
| 16.7 | 3 | 2.97 | 2.44 | 2.41 | 3.4 | 3.36 |
| 25 | 2.97 | 2.75 | 2.41 | 2.35 | 3.13 | 3.29 |
| 33.4 | 2.88 | 2.82 | 2.41 | 2.37 | 3.12 | 2.98 |
| 41.7 | 2.77 | 2.77 | 2.39 | 2.4 | 3.02 | 2.87 |
| 50 | 2.71 | 2.74 | 2.39 | 2.4 | 2.96 | 2.88 |
| 58.4 | 2.63 | 2.68 | 2.39 | 2.39 | 2.89 | 2.84 |
| 66.7 | 2.6 | 2.66 | 2.37 | 2.39 | 2.91 | 2.84 |
| 75 | 2.56 | 2.6 | 2.35 | 2.38 | 2.81 | 2.81 |
| 83.4 | 2.55 | 2.61 | 2.35 | 2.37 | 2.8 | 2.79 |
| 91.7 | 2.53 | 2.57 | 2.35 | 2.35 | 2.76 | 2.78 |
| 100 | 2.51 | 2.56 | 2.41 | 2.4 | 2.75 | 2.78 |
| 108.3 | 2.49 | 2.55 | 2.42 | 2.34 | 2.72 | 2.76 |
| 116.7 | 2.49 | 2.74 | 2.38 | 2.33 | 2.69 | 2.75 |
| 125 | 2.49 | 2.52 | 2.35 | 2.32 | 2.67 | 1.73 |
| 133.3 | 2.48 | 2.5 | 2.34 | 2.33 | 2.66 | 2.72 |
| 141.7 | 2.47 | 2.49 | 2.45 | 2.31 | 2.64 | 1.68 |

FIG. 17(B)

| TIME | 1 | 2 | 3 | 4 | 5 | 6 | 7 | 8 |
|---|---|---|---|---|---|---|---|---|
| 266.9 | 1.65 | 1.66 | 1.29 | 1.35 | 1.58 | 1.55 | 1.75 | 1.70 |
| 274.9 | 1.68 | 1.67 | 1.31 | 1.40 | 1.64 | 1.61 | 2.27 | 1.92 |
| 282.8 | 1.94 | 1.96 | 1.49 | 1.56 | 1.86 | 1.85 | 2.26 | 2.21 |
| 290.8 | 2.17 | 2.17 | 1.71 | 1.79 | 2.01 | 2.00 | 2.45 | 2.41 |
| 299.1 | 2.39 | 2.35 | 1.82 | 1.94 | 2.22 | 2.21 | 2.68 | 2.64 |
| 307.4 | 2.32 | 2.28 | 1.80 | 1.93 | 2.21 | 2.18 | 2.60 | 2.54 |
| 315.8 | 2.33 | 2.27 | 1.83 | 1.96 | 2.22 | 2.18 | 2.57 | 2.36 |
| 324.1 | 2.25 | 2.21 | 1.79 | 1.94 | 2.16 | 2.13 | 2.36 | 2.37 |
| 332.4 | 2.24 | 2.24 | 1.77 | 1.94 | 2.15 | 2.14 | 2.32 | 2.36 |
| 341.0 | 2.15 | 2.19 | 1.76 | 1.95 | 2.11 | 2.10 | 2.30 | 2.38 |
| 349.0 | 2.16 | 2.18 | 1.77 | 1.96 | 2.11 | 2.09 | 2.28 | 2.37 |
| 357.4 | 2.13 | 2.15 | 1.75 | 1.95 | 2.08 | 2.06 | 2.29 | 2.38 |
| 365.8 | 2.14 | 2.18 | 1.75 | 1.95 | 2.06 | 2.08 | 2.31 | 2.37 |
| 374.2 | 2.11 | 2.14 | 1.73 | 1.91 | 2.01 | 2.03 | 2.29 | 2.38 |
| 382.4 | 2.12 | 2.14 | 1.74 | 1.94 | 2.01 | 2.03 | 2.29 | 2.37 |
| 390.8 | 2.11 | 2.12 | 1.73 | 1.93 | 1.97 | 1.99 | 2.28 | 2.38 |
| 399.2 | 2.13 | 2.15 | 1.73 | 1.94 | 1.98 | 2.01 | 2.27 | 2.37 |
| 407.7 | 2.10 | 2.13 | 1.77 | 1.91 | 1.95 | 1.99 | 2.28 | 2.36 |
| 415.8 | 2.09 | 2.13 | 1.76 | 1.92 | 1.95 | 2.00 | 2.28 | 2.37 |
| 424.1 | 2.09 | 2.09 | 1.76 | 1.92 | 1.92 | 1.97 | 2.29 | 2.35 |
| 432.6 | 2.10 | 2.12 | 1.79 | 1.94 | 1.93 | 1.99 | 2.27 | 2.36 |
| 440.9 | 2.09 | 2.11 | 1.74 | 1.91 | 1.92 | 1.96 | 2.27 | 2.35 |
| 449.1 | 2.08 | 2.11 | 1.77 | 1.90 | 1.93 | 1.99 | 2.27 | 2.36 |
| 457.5 | 2.06 | 2.08 | 1.74 | 1.91 | 1.91 | 1.97 | 2.27 | 2.36 |

APPARATUS FOR NONDESTRUCTIVE ON-LINE INSPECTION OF ELECTRIC RESISTANCE WELDING STATES AND A METHOD THEREOF

BACKGROUND OF THE INVENTION

1. Technical Field

This invention relates generally to an apparatus and a method for inspection of an electric resistance welding state, and more particularly to an on-line nondestructive inspection apparatus and a method thereof making use of a neural network and carrying out the inspection simultaneously with the welding operation.

2. Description of the Prior Art

An electric resistance welding is that joins two parts to be melted and fused under pressure by making use of heat developed by an electric current flowing through them. The electric resistance heat can be determined by $$Q = 0.24 \, I^2 R t \qquad (1)$$

where,

Q is amount of heat,

I is current flowing through welding objects,

R is resistance of the contact point of welding objects, and t is time in seconds Generally, in electric resistance welding, high resistive materials are used for load site, and a low voltage and high current source is employed for power site so that heat generated when the high current flows through the high resistive material can be used for joining the materials. The current is as high as up to 80,000 Amperes and the voltage dropped to the both sides of the load is as low as 1–10 Voltages. This large current/small voltage power source can be easily obtained by employing an alternating current source and a transformer.

Electric resistance welding can be accomplished by many methods including butt welding, spot welding, seam welding, projection welding and so on. These methods have an advantage that the welding temperature is somewhat low and the welding takes a short operation time; further, the welding reliability is improved.

In particular, spot welding is a low-cost and mass productive operation and has performance benefits such as very strong joining strength, light weight, savings of materials and simple structure. And how much the operator is skilled or trained cannot influence the spot welding since the condition of the operation is determined by the welding machine used. As a result, the spot welding is broadly and commonly used in the metallurgical industry.

Accordingly, the description below will focus on spot welding.

FIG. 1 is a schematic diagram of a spot welding machine. In FIG. 1 are shown a welding transformer 1, a control part 2 connected to the first winding of the transformer 1, electrodes 3a and 3b (also referred to as 'welding rods') connected to the second winding of the transformer 1, a compressing part 5 and parent base metals 7 (welding objects) interposed between the two electrodes 3a and 3b.

When a current begins to flow through the base metals 7 from the electrodes 3a, 3b with the base metals being under pressure by the compression part 5, the contact area of the metals will locally glow red with the heat. By pressing again the base metals with a suitable compression force, spot welding can be accomplished with using only small circular area corresponding to the contact area of the electrodes to the base metals. The welding point has a circular form called as a negget.

Spot welding is also called point welding since the welded area seems like a point, and can join the welding objects without perforating any holes unlike a riveted joint in which two metal plates are permanently joined together by forming many rivet holes and by inserting rivets through the aligned holes.

It should be noted that any defect of the welded area will degrade the reliability of the spot welding, in particular when pressure is applied repeatedly or impulsively. And safety of the work becomes very important factor in case of high pressure and load used. Accordingly, defects of the welding area should be eliminated.

The method for inspection of the welded area is divided into destructive testing and non-destructive testing. In the destructive testing method, the welded area of a selection of an certain collection or of a test sample manufactured for a specific purpose is used in the inspection. Destructive testing includes a punching test, a fracture surface test, a macro organization test and a micro organization test, etc. In general, a direct destructive testing which destroys the selected test sample after carrying out the spot welding is broadly used. If defects or problems are found, all of the foregoing operations should be deleted or reworked.

Accordingly, the destructive testing is limited in automatic operation because the reliability of the product is poor and the test procedure is not efficient. Further the destructive testing gives rise to a great loss of samples as well as a loss of manpower.

Alternative to destructive testing is non-destructive testing or inspection. Non-destructive inspection does not change the shape, dimension of the product nor damage or destroy test sample in estimating the integrity of the welded area. The non-destructive inspection makes use of x-rays, ultrasonics, radiography, magnetic flux, paint penetration, and so on.

X-ray inspection, which is a kind of radiograph test, can utilize a difference of light and darkness in image of the rays in order to inspect the failure of the welding because the segregation of the defects and impurities are easy to project the x-rays and are highly photo-sensitive. However, an apparatus used in x-ray inspection is very expensive and causes a security problem in a working gap, and uncomfortably the operator needs to always watch and handle the apparatus as the inspection operation is performed.

In ultrasonics inspection, it is difficult to test a sample having a very complex shape or a very coarse surface, and the ultrasonic wave cannot penetrate through a high density material such as a steel plate.

And the magnetic flux test can be applied only to ferromagnetic materials and presently remains in theoretical study.

The paint penetration test cannot detect the defects of the sample which do not reach to the surface, and has a drawback that the surface of the sample should be grounded before welding.

As a result, the above mentioned non-destructive inspection methods are not commonly used, and they need, like the destructive test, additional inspection steps after the welding operation, and accordingly produce losses of time and manpower.

As perceived from the above description, it is required to test or inspect the defects of the welded area simultaneously with the welding operation rather than after the welding operation. In order to meet the requirement, a new and non-destructive test method needed to be developed. However, the welding state varies upon several parameters such as the amount of the applied current, operation time, the condition of the welding electrode tip, the pressure and the choice of a material for the base metal. Accordingly, it is difficult to develop a non-destructive test system, capable accommodating the various signals of applied voltage waveforms which are fluctuated corresponding to the variation of the welding state.

SUMMARY OF THE INVENTION

Accordingly, it is an object of this invention to provide a new apparatus and a method for non-destructive inspection of the defects and the integrity of joined materials welded using electric resistance welding technology.

It is another object of the present invention to provide a new apparatus and a method for non-destructive on-line inspection of the defects and the integrity of joined materials, which can be carried out simultaneously with the electric resistance welding operation.

In order to accomplish the objects, the present invention is characterized in that the voltage waveform applied to both sides of the base material which is varied in accordance with the progress of the welding operation is utilized in the inspection of the welding.

And in order to accomplish the objects of the present invention, both the voltage waveform which is applied to both sides of the base material and varied in accordance with the progress of the welding operation, and the electrode movement waveform which is displacement of the distance between two welding electrode tips are utilized in the inspection of the welding.

Further, in order to accomplish the objects of the present invention, an apparatus for electric resistance welding and inspection comprising the first electrode connected to one end of a power source, the second electrode connected to ground terminal, and a load interposed between the first and second nodes is characterized in that A) an analog to digital (A/D) converter for converting voltage signals detected from an electrode into digital signals, B) software for receiving the digital signals converted by the A/D converter and for detecting maximum values at each cycle of the digital signals, and C) a computer system comprising a multi-layered neural network for receiving the data from the software and for inspecting the welding state of the load are provided.

According to one aspect of the present invention, a method for inspecting an electric resistance welding state, comprises an off-line learning stage including: 1) a first step comprising the substeps of A) applying a voltage signal to both ends of each of at least two welding objects through a first and a second welding electrodes, so that the welding objects can be joined together, B) converting said voltage signal into digital data, C) detecting a variation of peak values of said converted digital data, D) saving said detected variation in a computer system, 2) a second step comprising a sub-step of monitoring a welding state of said welding objects, 3) a third step comprising the sub-steps of A) repeating the first and the second steps, B) inputting actual output data and a predetermined desired output data into a neural network contained in the computer system, said actual output data representing the variation of peak values and said desired output data corresponding to respective welding state, C) determining weight values of the neural network by using a backpropagation algorithm, and an inspection stage including: 1) inputting said detected variation in the first step into the neural network having the weight values determined in the sub-step C) of the third step, 2) performing on-line inspection of the welding state.

According to another aspect of the present invention an apparatus for electric resistance welding state inspection comprising the first node connected to one end of a power source, the second node connected to other end of the power source, and a load interposed between the first and second nodes is characterized in that A) an analog to digital (A/D) converter for converting voltage signals detected from sensor system which detects the distance between the first and second nodes into digital signals, B) software for receiving the digital signals converted by the A/D converter and for collecting data at each cycle of the digital signals, and C) a computer system comprising a multi-layered neural network for receiving the data from the software and for inspecting the welding state of the load, further comprises a sensing means for measuring the distance between the first and the second welding electrodes, and wherein the converting means is connected between the sensing means and the computer system.

According to still another aspect of the present invention, a method for inspecting an electric resistance welding state, comprises an off-line learning stage including: 1) a first step comprising the sub-steps of A) applying a voltage signal to both ends of each of at least two welding objects through a first and a second welding electrodes, so that the welding objects can be joined together, B) converting said voltage signal and an electrode movement pattern into digital data, C) detecting a variation of peak values of said converted digital data, D) saving said detected variation in a computer system, 2) a second step comprising a sub-step of monitoring a welding state of said welding objects, 3) a third step comprising the sub-steps of A) repeating the first and second steps, B) inputting actual output data and a predetermined desired output data into a neural network contained in the computer system, said actual output data representing the variation of peak values of the voltage signal and the electrode movement pattern, and said desired output data corresponding to respective welding state, C) determining weight values of the neural network by using a backpropagation algorithm, and an inspection stage including: 1) inputting said detected variation in the first step into the neural network having the weight values determined in the sub-step C) of the third step, 2) performing on-line inspection of the welding state.

BRIEF DESCRIPTION OF THE INVENTION

For a more complete understanding of the present invention and for further advantages thereof, reference is now made to the following Detailed Description, taken in conjunction with the accompanying drawings, in which:

FIG. 11 is a flow chart in order to input waveforms of the applied voltage suitable for embodying the present invention;

FIG. 13 is a flow chart of the operation of the neural network monitoring system used in the present invention;

FIG. 14 is a table of learning data according to one embodiment of the present invention;

FIG. 15A is an AC voltage waveform of the first illustrative embodiment of the present invention;

FIG. 15B is a table of standard data according to the first embodiment of the present invention, which shows the influence of the current variation on the welding state;

FIG. 16A is an AC voltage waveform of the second illustrative embodiment of the present invention;

FIG. 16B is a table of standard data according to the second embodiment of the present invention;

FIG. 17B is a table of standard data according to the another embodiment of the present invention;

DETAILED DESCRIPTION OF PREFERRED EMBODIMENTS OF THE INVENTION

Prior to describing the structure of the spot welding apparatus according to the present invention, waveforms of applied voltage to both ends of base metals, electrode movement patterns, and factors affecting the integrity of the welding will be explained.

Driving modes of a spot welding machine can be classified into a mode using a DC power source which employs an invertor and a mode using an AC power source. The DC driving spot welding machine can estimate the welding state by directly receiving voltage values and analyzing the waveform obtained from the values.

Figure 1:
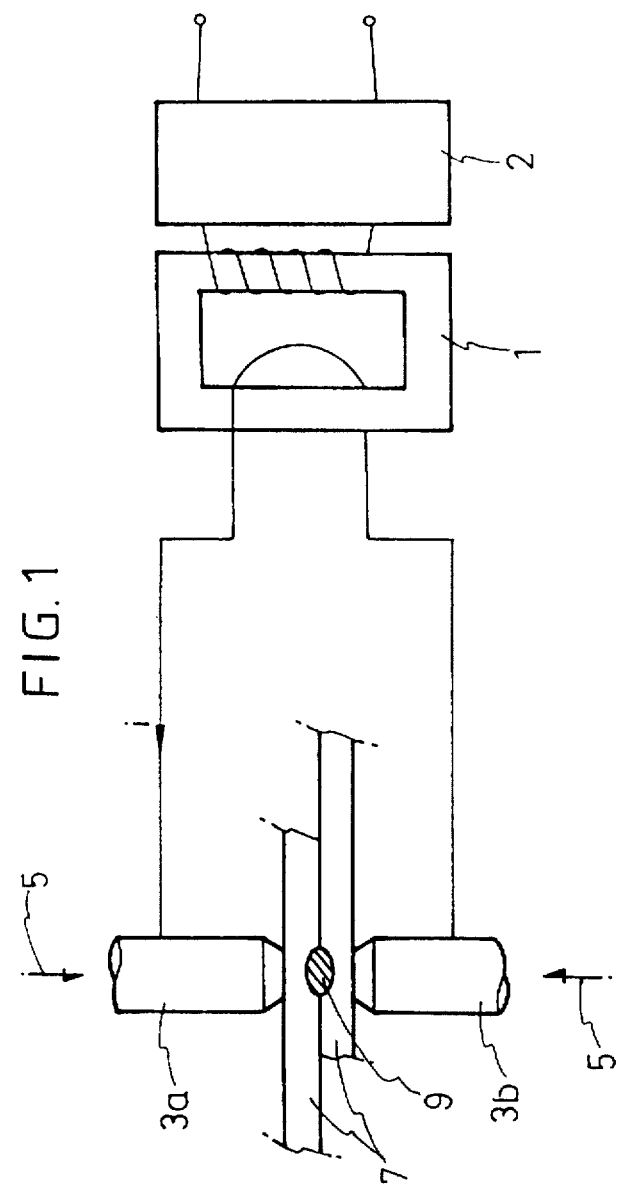
FIG. 1 is a schematic diagram of a spot welding machine.
Figure 2:
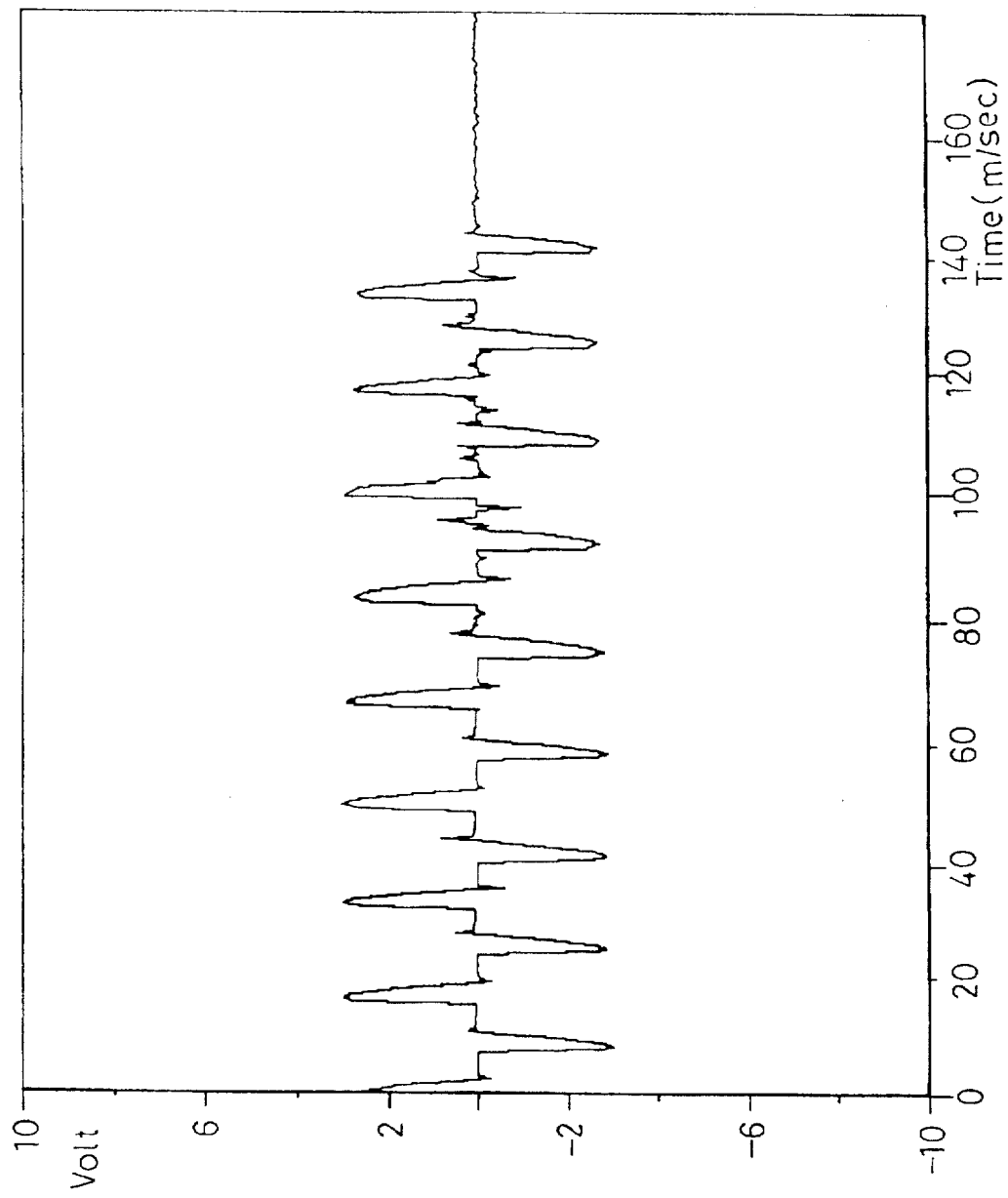
FIG. 2 is a voltage waveform during a spot welding operation.

FIG. 2 shows a voltage waveform during welding operation of a spot welding machine adopting the AC power source as a driving mode. In this Figure, the voltage wave form of the spot welding machine is a sine wave housing a cycle of, e.g., 60 Hz.

Because low voltage values do not have a great influence on the welding, a thyristor of a controller is adjusted so that electrical potential can be applied only during a few milliseconds when the voltages represent maximum or minimum values of the sine wave. The applying time of voltage is allowed, by adjusting the controller having the thyristor, to be in a range from several milliseconds to several hundreds millisconds.

Referring to FIG. 2, the values of the applied voltage range from 2.5 to 3.0 V and gradually go down as the welding is progressed. The time required in analog-digital converting is changed, in a software, based upon the duration of voltage applied by a welding machine, and the start of the analog-digital conversion is initiated by a trigger of input voltage.

For example, when the voltage applying time is 150 msec. and a sampling time is 0.1 msec., the number of data is 1500. However, these 1500 data are difficult to be analyzed in real time on-line method. And it is peak values of each of sine waves, i.e., maximum and minimum voltages to directly affect the spot welding. Accordingly only the max/min voltages are enough to be used in the inspection of the welding.

Figure 3:
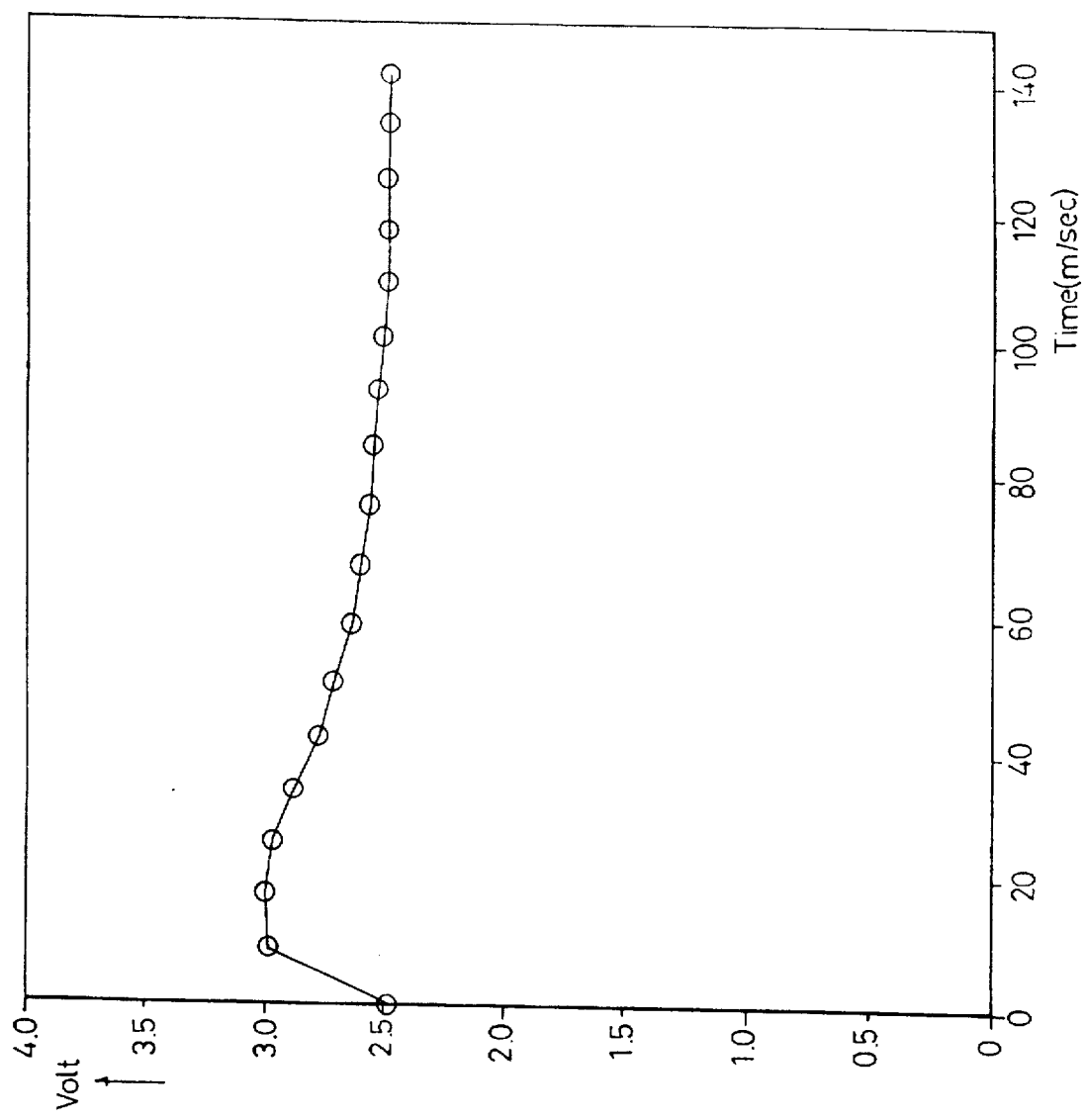
FIG. 3 is a plot of a voltage waveform used for inspection of spot welding state and shows the variation of peak values of voltage applied by a spot welding machine to welding objects.

FIG. 3 is a voltage waveform used in inspection of the spot welding and shows the variation of peak values of the applied voltages. Assuming that the voltage is applied for 150 msec., a 60 Hz sine wave has 9 cycles for a single spot welding operation, and accordingly 18 peak values can be obtained.

In order to obtain 18 data as shown in small circular in FIG. 3, analog signals generated during the welding operation are converted into digital signals, and all negative values in the digital signals are changed into their absolute values by a software in a computer system. Then by selecting peak values from the positive and absolute values and by plotting the peak values we can obtain a graph showing the variation of the peaks as shown in FIG. 3.

From FIG. 3 it can be understood that since the joining of the base metal welding objects is not yet perform in the early stage, the resistance is so high that the voltages have peak values. However, the values of the voltages decrease as the welding operation is progressed. The plot of FIG. 3 represents the variation of peak voltage values when the welding is normally carried out, and is differentiated from the waveforms when the welding is excessively or insufficiently performed.

Figure 4:
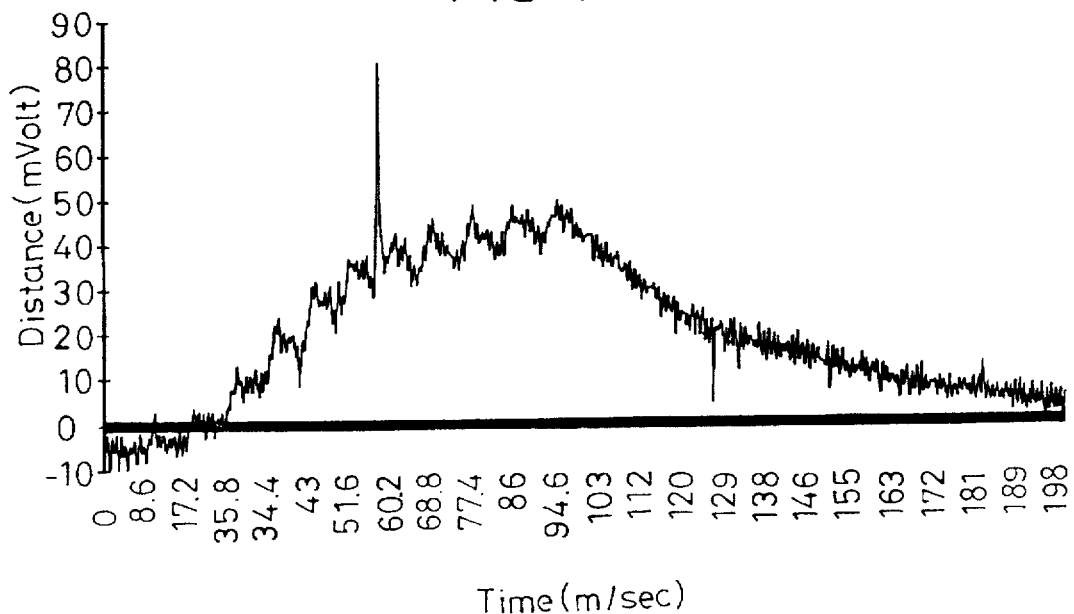
FIG. 4 is a plot of electrode movement pattern after converted by an A/D board.

FIG. 4 is an electrode movement pattern which represents a moving of the welding electrodes while the welding is operated. The electrode movement pattern utilizes the fact that the distance between two welding electrodes becomes far by the heat of the first stage of the welding operation, while the welding electrodes are extracted after welding. In this figure, the initial distance of the electrodes is set zero (0), and variations of the electrode distance are measured. Since the electrode movement pattern of FIG. 4 is obtained by using an optical sensor system which outputs the measured distance variation in the form of voltages and by using a computer system which reads data converted from the output of the optical sensor system by an A/D converting, it can be seen from the pattern that the vibration of the welding machine itself and external noises have great influence on the pattern.

Figure 5:
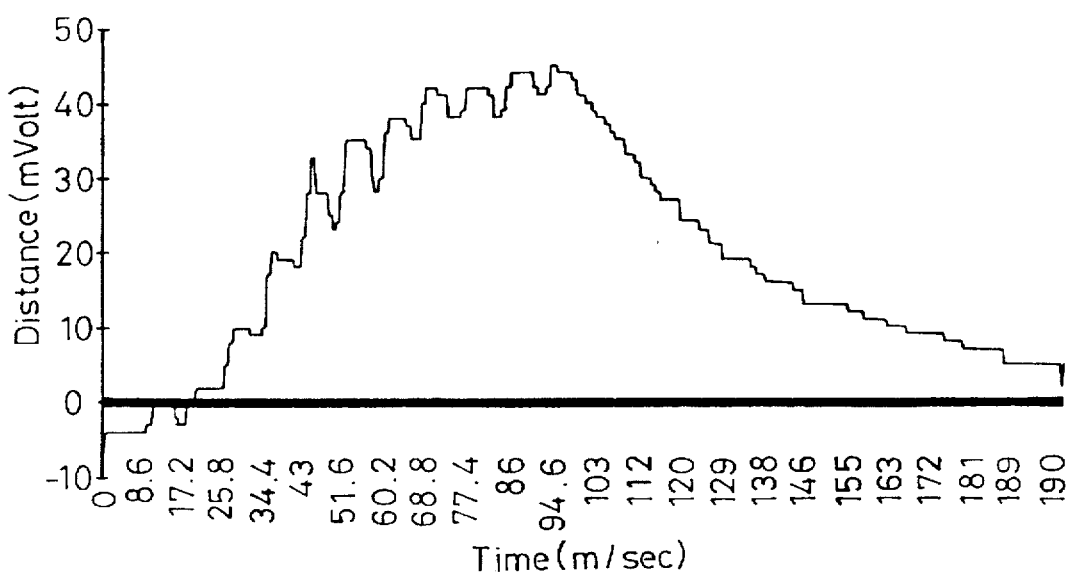
FIG. 5 is a plot of an electrode movement pattern after being filtered by a digital filter for eliminating noise from generated abrupt vibration of the welding machine.

FIG. 5 is an electrode movement pattern in which the vibration of the welding machine and the external noises are removed by a digital filter.

Figure 6:
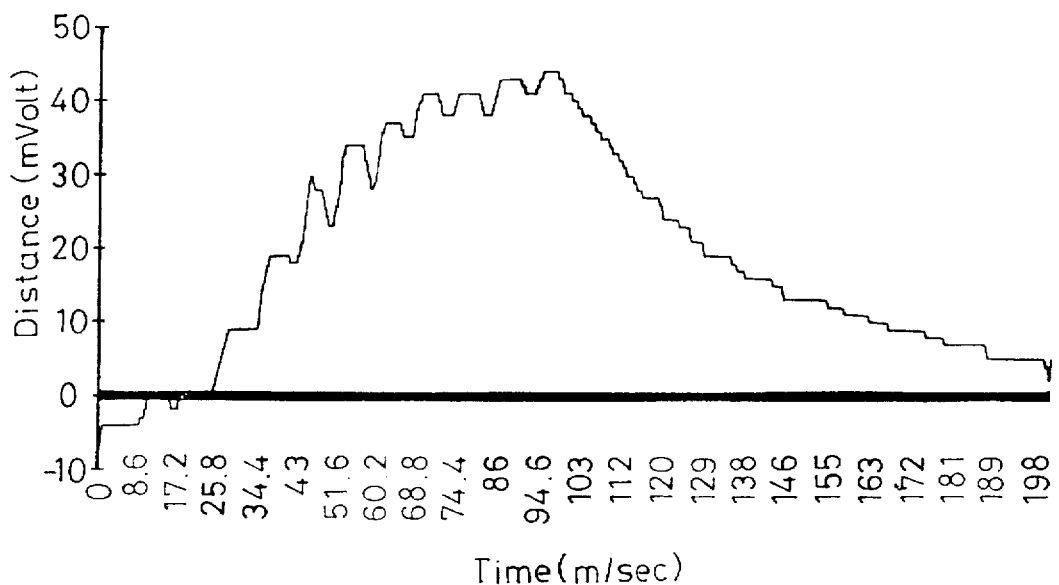
FIG. 6 is a plot of an electrode movement pattern after being transformed by a moving average method.

FIG. 6 is an electrode movement pattern transformed into more smooth curved pattern by use of a moving average method.

Figure 7:
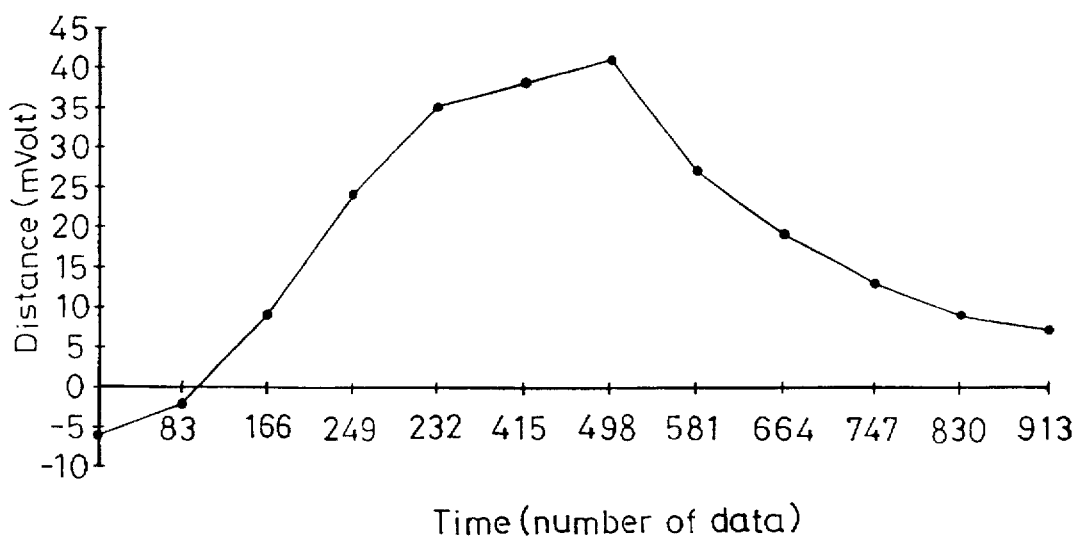
FIG. 7 is a plot of a sampled electrode movement pattern.

FIG. 7 is a plot which is obtained by synchronizing the waveform of FIG. 6 to a frequency of a voltage waveform, and then by sampling the synchronized waveform. The electrode movement pattern of this figure shows an overall shape of the variation of the electrode distance, and is used in inspection of the welding state.

The voltage waveforms as shown in FIG. 3 and the electrode movement pattern for respective welding states will be utilized in a welding inspection of the present invention.

The factors affecting the welding states of an electric resistance welding are the variations of applied current, compression force of the electrodes and the change of cross-sectional area of electrodes due to abrasion by long use of the electrodes. These three factors will change the welding states, and may result in failure or error of the welding. The change of the welding states due to the variation of each of three factors can be found out and estimated by the waveform of voltages applied to both sides of the welding objects during the welding is performed and by the waveform of electrode expansion.

First, an influence of the current variation on the welding state will be explained.

Because a driving mode of the spot welding machine presently used commonly uses of constant current source, the current has a fixed value when the welding is performed. Accordingly, as shown in the below equation, the variation of applied voltages is proportional to only a variation of resistance of the welding objects.

$$E = I \times R \qquad (2)$$

where, E is voltage, I is current, R is resistance.

Although current is fixed in the spot welding machine using the constant current driving mode, the amount of current may be changed by an error of operator who handles a controller of the spot welding machine. If all other conditions are constant the resistance of the welding objects is not varied by the current variation.

The heat generated in the electric resistance welding can be obtained by Equation 1, and can be rewritten by $$Q = 0.24\ I^2\ R\ t = 0.24\ I\ E\ t \qquad (3)$$

From Equation 3, it can be understood that increase of current (I) will generate much heat and cause an excessive over welding, and that decrease of current will produce little heat and cause an insufficient under welding.

Second, an influence of variations of the compression force of the electrodes will be explained.

The spot welding is performed by compressing the welding objects by using the electrode, and by applying a current to flow through the objects. At this time, it is preferable to make constant the pressure of the electrode to the welding objects. However, as the pressure is a parameter having a physical property it cannot easily controlled and easy to vary in accordance with time variation. This variation of the pressure greatest influence on the welding state, since it has close relation with the contact resistance of the welding objects.

An increase of the pressure reduces the contact resistance between two base metal welding objects, and a decrease of the pressure increases the contact resistance. In other words, the pressure is in inverse proportion to the contact resistance. And the pressure is also inversely proportional to the thickness of the welding objects.

The contact resistance can be expressed by:

$$R = (\rho t / A) \qquad (4)$$

where, $\rho$ is a resistivity of the welding objects, t is thickness of the welding objects, and A is an contact area of the electrode and the object.

As apparent, Equation 4, an increase of the thickness (t) results in an increase of the contact resistance. The increases of the thickness and the contact resistance will cause the increase of applied voltage.

In conclusion, when the compression force of the electrodes, i.e., the pressure is increased, the resistance is reduced resulting in an insufficient welding. And when the pressure is decreased, the resistance is increased resulting in an excessive welding.

Now will be explained an influence of a variation of an cross-sectional area of welding rods i.e. of contact area of the electrodes to the welding objects.

In the spot welding, the electrodes are worn out by continuous use, and the contacting area of the electrodes will be broader than that of the initial used. This variation of an increased area of the electrodes changes both the resistance and the applied voltage by two conflicting parameters: an increase of the contact resistance due to a decrease of the pressure per unit area, and a decrease of the resistance due to the increase of the contact area (see Equation 4). The relationship of the contacting area of the welding rods to the pressure can be expressed by:

$$F = P/A \qquad (5)$$

where,

F is a compressing force per unit area,

P is a pressure, and

A is a contacting area of the welding rods.

As seen from Equation 5, the contacting area (A) is inversely proportional to the compressing force per unit area.

And a resistance considering the contact resistance coefficient ($\rho$) can be determined by:

$$R = (\rho + \rho') t / A \qquad (6)$$

$$\rho' \propto A/P \qquad (7)$$

In Equations 6 and 7, the contact resistance coefficient ($\rho'$) is proportional to the contacting area (A), and serves to increase the total resistance (R). Accordingly, an increase of the contacting area results in a decrease of resistance according to Equation 4.

As a result, the variation of the applied pressure according to the change of the contacting area of welding rods is affected by both conflicting parameters of 1) increase of the contact resistance resulted from a decrease of pressure per unit area, and of 2) decrease of the resistance resulted from an increase of contacting area. However, since the decrease of the resistance due to the increase of the contacting area is direct while the increase of the resistance due to the decrease of pressure per unit area is indirect, the resistance is in actuality reduced. However, in the inspection of the welding state based upon the variation of the contacting area of the welding electrode tips, it is difficult to differentiate the voltage waveform obtained when the welding is good from the voltage waveform obtained when the welding is poor, since the two voltage waveforms are analogous.

In order to overcome this difficulty, the present invention adopts an inspection technology using a waveform of the expansion of the gap between two electrodes in the inspection performed based upon the variation of the contacting area of the electrode tips. The waveform of the electrode gap expansion can be plotted by introducing the concept that the gap between two electrodes will be expanded by heat of the first stage of the welding, but the gap will be shrunken when the welding is over. If the contacting area of the electrode tip becomes larger, the widened heat area will result in very minute expansion of the gap and the shrinkage of the gap cannot be observed since no welded area exists. By utilizing this principle, we can establish the relationship between the waveform of the electrode gap expansion and the contacting area of the electrode tips. Because, the gap expansion is very small, as small as approximately 0.1 mm in case of a steel plate of 1 mm thickness used, an optic sensor of non-contact type is used in measurement of the variation of the gap.

In conclusion of the above described electric resistance welding, when the current is reduced, heat produced becomes small and an insufficient welding happens, and also when pressure put on the welding objects or a contacting area of the electrode tips becomes larger, the contact resistance is decreased resulting in an insufficient welding. And it should be noted that the welding state is dependent upon an unexpected change of applied current, the variation of the compressing force, and the variation of the contacting area of the electrode tip resulted from a constant use of the same electrode, and that the variations of the above parameters are detected by the variations of the waveforms of the applied voltage and the gap between the electrodes.

According to the present invention, a multi-layered neural network which adopts a learning method suitable for mapping the variation signals changed by various factors is included for a pattern recognition of each of the welding states. With use of the neural network in analysis of the waveforms of the applied voltage and of the electrode gap expansion, causes of the welding failure or error can be detected in real time, and the welding states can be immediately estimated in the working place of the electric resistance welding.

Now will be detailed described the preferred embodiments of the present invention.

Figure 8:
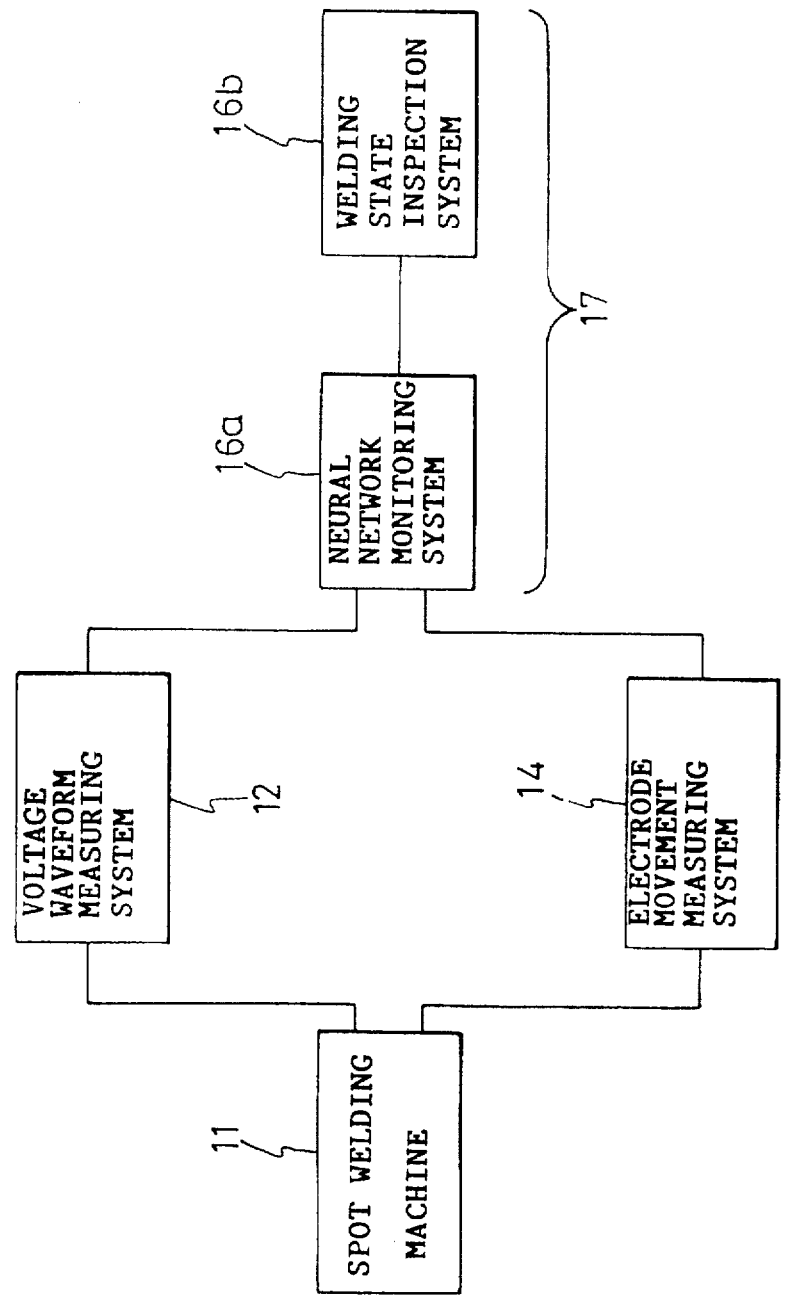
FIG. 8 is a block diagram of another embodiment according to the present invention, and shows the embodiment utilizing in the inspection of the welding the waveforms of voltage applied both ends of the welding objects and of electrode gap expansion.

FIG. 8 is a schematic diagram of a welding state monitoring system using a neural network, which comprises a spot welding machine 11, a voltage waveform measuring system 12, an electrode movement measuring system 14, a neural network monitoring system 16a, and a welding state inspection system 16b.

Figure 9A:
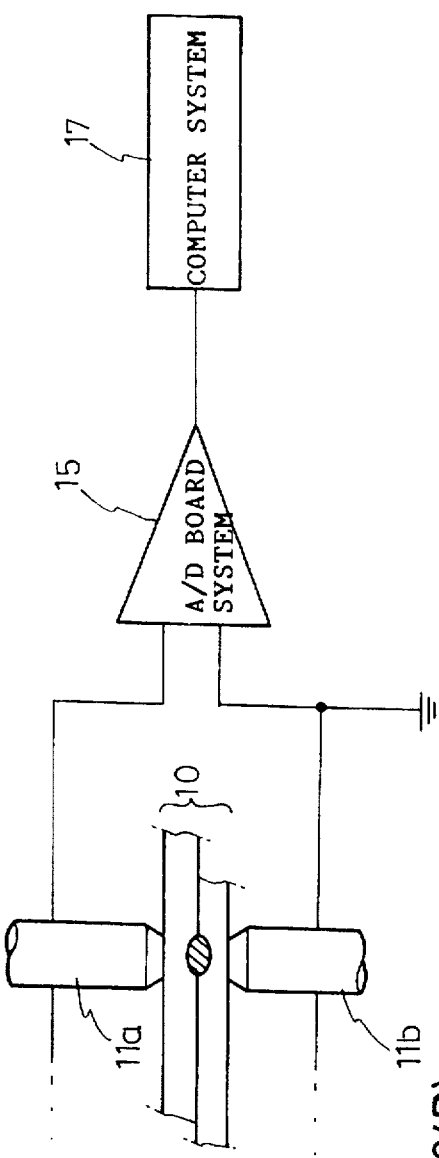
FIG. 9A and 9C are block diagrams of one embodiment according to the present invention.
Figure 9B:
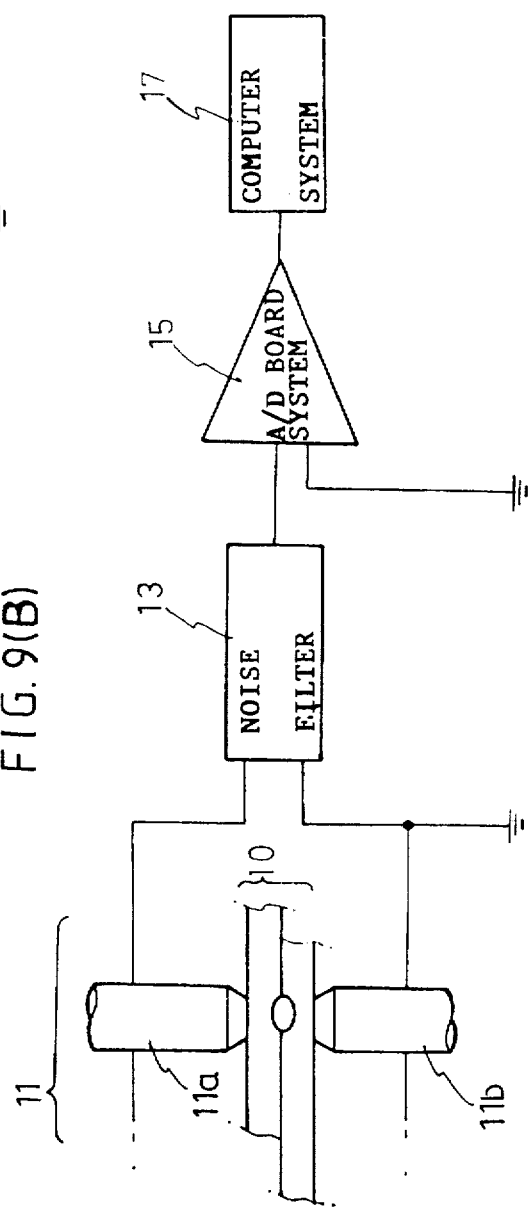
Figure 9C:
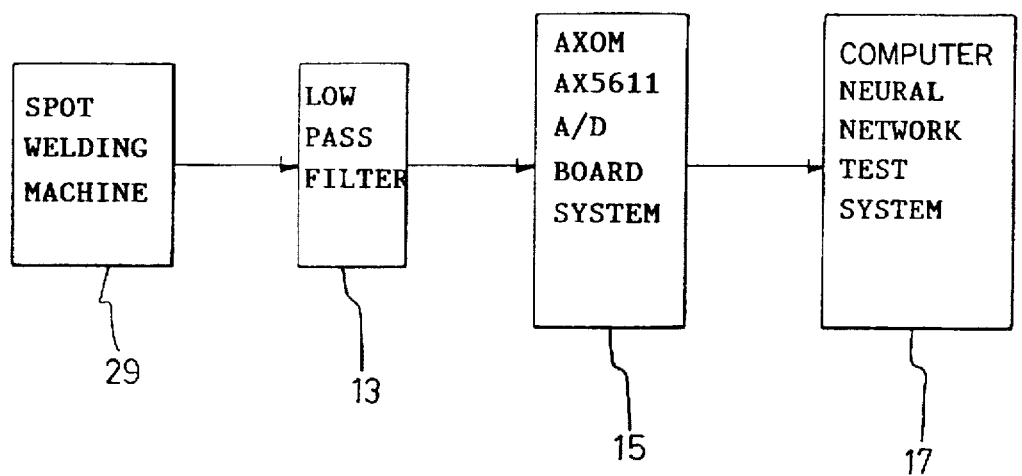

FIGS. 9A to 9C are block diagrams of an illustrative embodiment of the spot welding machine according to the present invention, which utilizes waveforms of the voltages applied to both ends of base metal welding objects in inspection of the welding states.

Referring to FIG. 9A, a spot welding machine 11 of the present invention having first and second electrodes (11a and 11b) connected to respective terminals of a power source (not shown), and a load 12 interposed between the two electrodes is provided with an analog/digital converter 15 for detecting the analog voltage signals from the nodes 11a and 11b and for converting the detected voltage signals into digital data, and with a computer system 17 for receiving the digital data from the analog/digital converter 15. In this embodiment, the second node, i.e., the lower potential point 1b is grounded. The converter 15 is activated by the computer system 17 in order to convert the analog voltage signals to digital data.

In the embodiment of the present invention, as the analog/digital converter 15 there is used a high performance DA&C carrier board, e.g. an AX5611c-L available from Axom Inc. The carrier board has up to 16 inputs and can perform sampling of 1 Mhz using DMA (Direct Memory Access) technology. However, single channel is used and sampling time is set 10 Khz in order to read out voltage waveforms corresponding to a single welding point.

The computer system 17 comprises software for processing the digitalized voltage data and a neural network. The software in the computer system 17 may be constituted by a program converting the digital voltage data into absolute value data, and a program for detecting peak values from the absolute value data.

The neural network adjusts weight values through a predetermined learning method and stores the waveforms of standard welding voltage and of standard electrode gap expansion. Thus an inspection of the welding is performed by using the stored weight values.

FIG. 9B is a block diagram of another embodiment of the present invention. Compared to the embodiment shown in FIG. 9A, a noise filter 13 is further provided between the spot welding machine 11 and A/D converter 15. The noise filter 13 receives a voltage dropped between the first electrode 11a and the second electrode 11b which is lower potential point and grounded.

Actually, many high frequency noises are generated from the spot welding machine as well as from the noisy environment of a factory processing the spot welding. Further, the supply voltage has a cycle of about 60 Hz. Accordingly, in the FIG. 9B embodiment of the present invention the noise filter 13 is a low pass filter (LPF) which can not pass a high frequency noise signal.

However, the noise filter may be properly chosen based upon what noises are generated and what forms of voltages are supplied.

FIG. 9C is a block diagram of FIG. 9B.

Figure 10A:
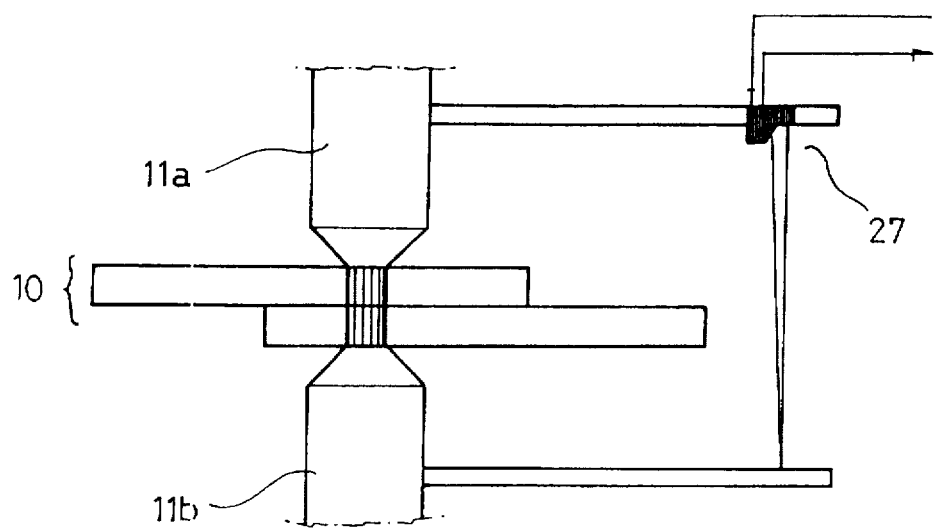
FIG. 10A to 10B are block diagrams of another embodiment according to the present invention, and shows the embodiment utilizing in the inspection of the welding the waveforms of voltage applied both ends of the welding objects and of electrode gap expansion.
Figure 10B:
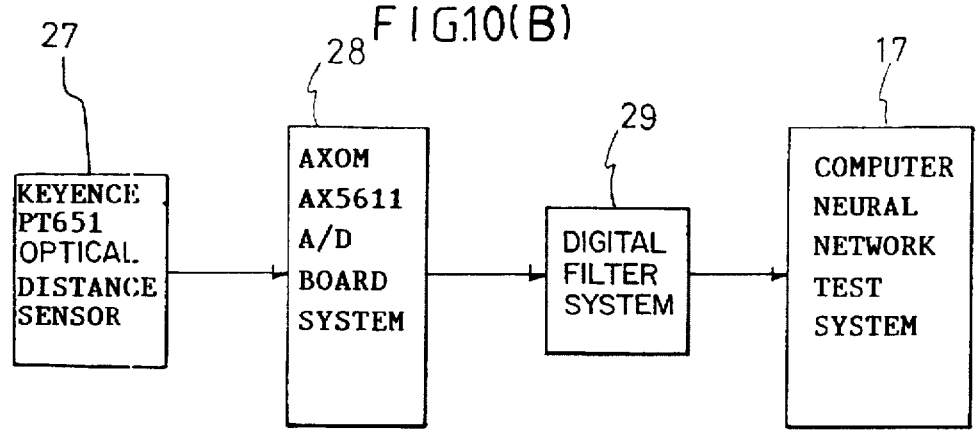

FIGS. 10A and 10B are block diagrams illustrating the situation when the electrode movement patterns occurring at both ends of the welding objects during the welding operation are utilized in the welding state inspection.

FIG. 10A is a schematic diagram of a subsystem for measuring electrode movement pattern which is provided with a non-contacted optical sensor 27 (also referred to as an optical distance sensor) for detecting changes of the gap between the two welding electrodes which supply voltage potentials to the welding objects.

FIG. 10B shows another embodiment of a subsystem for measuring electrode movement pattern, which comprises a non-contacted optical sensor 27 for detecting the expansion of the gap between two welding electrodes, an analog/digital converter 28 for receiving the output of the sensor 27, and a digital filter 29 for receiving the output of the analog/digital converter 28.

Since the above-described embodiment of the present invention uses an inexpensive optical sensor which can detect any variation without contact with the sensing object, it is possible to measure the variation with no information of the standard distance. In most of the present research through many experiments, a contacted optical sensor is used which requires information about the standard distance of the welding electrodes, and which outputs inexact measurement results. The standard distance information can be normalized in laboratory, but in actual industrial use the variation of parameter due to the constant use of the welding electrodes makes it impossible to set up the standard distance of the electrodes. Further if a distance or gap measurement uses a laser, very exact and precise sensing is possible, but a sensor able to measure a micrometer unit is very expensive.

The measured data of the electrode gap expansion is input into and used in causing the neural network to be learned. A waveform of the electrode gap expansion can be plotted by continuously reading out, through a channel of the A/D converter 28, voltage signals measured by the optical distance sensor 27 of the electrode gap expansion measuring subsystem.

In this embodiment, the measuring subsystem is a PT-165 Optical Sensor System form Keyence Inc., Japan. using the PT-165 optical sensor, the measuring range is 2.5 centimeter, the accuracy is 5 micrometer, and −5 to +5 volt signals are linearly output. These output voltage signals, after being converted by the A/D board 28, are plotted as shown in FIG. 4.

From the waveform of the electrode gap expansion of FIG. 4, it can be understood that there is noise generated by vibration of the welding machine itself and irregular vibration of the electrode movement pattern. The noise due to these vibrations, if a digital filter 30 is disposed between the A/D converter 29 and the computer system 17 as shown in FIG. 10B, can be eliminated and the electrode movement pattern will be plotted as shown in FIG. 5.

Referring to FIG. 7, it is apparent that the noise is greatly reduced. The digital filter 29 is for filtering out the abrupt vibration of the welding machine. The filtered waveform can be transformed, by a moving average method, into a more smooth curve, which is plotted in FIG. 6.

Although a neural network can obtain data from the transformed electrode movement pattern, these data are too many to process in real time. Accordingly, the data must be sampled on a time base, e.g., a time corresponding to one wavelength of welding cycle. The sampled electrode movement pattern is illustrated in FIG. 7.

In FIG. 9, reading time of the all data is adjusted twice of the welding time in order to monitor the course of electrode movement (expansion and shrinkage). For example, when 6 cycles are used in welding, 12 data are read into and used in analysis of the characteristic of the electrode movement pattern.

As explained here-in-before, it becomes possible to inspect the welding states in an on-line nondestructive test mode by interconnecting the voltage waveform measuring subsystem and the electrode movement measuring subsystem to the spot welding machine, and by processing, with a computer system which comprises a neural network system, the variations of the voltage applied to both ends of the welding base metals and changes of the electrodes distance.

The term "on-line" means that the varying voltage signals and the changes of the welding electrode movement can be processed by computer system at the time of the act of welding by the spot welding machine.

Now will be explained the software and neural network which are contained in the computer system. The software is for activating the A/D board, and the neural network is for monitoring the welding state using signals processed by the A/D board.

FIG. 11 is a flow chart for receiving the voltage waveform according to the present invention so as to drive the hardware of the A/D board. Referring to FIG. 11, the flow consists of initiating the A/D board (step 31), selecting a suitable channel of the A/D board (step 33), setting sampling time (step 35), selecting hardware so that the A/D converter can start to run only when the voltage value is greater than a specific value (step 37), storing the converted digital data into a memory of the computer (step 39), selecting predetermined data (step 41), and saving the finally processed voltage data into a file which can be used in the learning procedures of the neural network (step 45). In step 41, data required respectively in the subsystems for measuring the voltage waveforms and the electrode movements are selected. In other words, for the voltage waveforms measuring subsystem, peak values which can influence the welding states are selected from the absolute values of the converted digital data in above described steps, while for the electrode movement measuring subsystem, electrode movement data are selected by removing vibration and noises with use of the digital filter and moving average technology, and by synchronizing the converted signals to a frequency of the voltage waveform.

Although as one embodiment of the present invention a single channel is selected in the step of selecting of a suitable channel, the AX 5611C board can input data through up to 16 channels. And in the step of setting the sampling time, maximum sampling time is 1 MHz. When the sampling time is set too small, although the accuracy of the data will be increased, the amounts of data are too great to be properly processed. Accordingly, in one embodiment of the present invention, 0.1 msec (i.e., 10 Khz) of sampling time is chosen for the voltage waveform measuring subsystem, and for the electrode movement measuring subsystem the sampling time corresponds to one wavelength of welding frequency.

On the other hand, sequential reading of data is adjusted to be carried out by initiating the A/D converter when voltages are over at specific value, because memory of computer is used and because other operations will be otherwise adversely troubled. The A/D board is started by an input trigger of, e.g., 0.7V. Though the steps 31, 33, 35, 37, the A/D board is set up. In the next step, 39, for more speedy data converting, the A/D board is driven by using DMA (Direct Memory Access) technology.

Figure 12A:
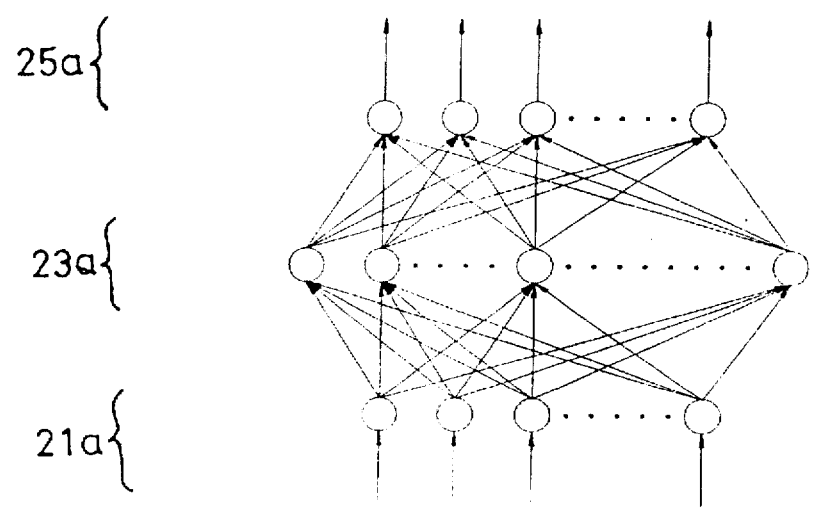
FIG. 12A shows the structure of a neural network which can perform learning and an on-line inspection, and consists of a multi-layered perceptron.

FIG. 12A shows the structure of a neural network which can perform learning and on-line inspection and consists of multi-layered perceptrons. The multi layered perceptron model which includes input layer 21a, hidden layer 23a and output layer 25a can solve a problem which cannot be separated linearly. One of the learning methods adapted to the perceptron model is a backpropagation learning algorithm developed by D. Rumelhart in 1986.

How many is suitable for the hidden layer and what number is adequate for the process unit of each hidden layer should be found out through a series of repeated experiments.

Here-in-after, a backpropagation algorithm which can learn the above described multi-layered perceptrons will be explained. The backpropagation algorithm is designed to minimize errors between actual outputs and desired outputs by using a gradient descent method. The outputs are represented by a non-linear function which can be differentiated. Generally as the nonlinear function, sigmoidal function is used and can be expressed by $$f(x) = \frac{1}{1+e^{-x}} \quad \text{(Equation 8)}$$

Figure 12B:
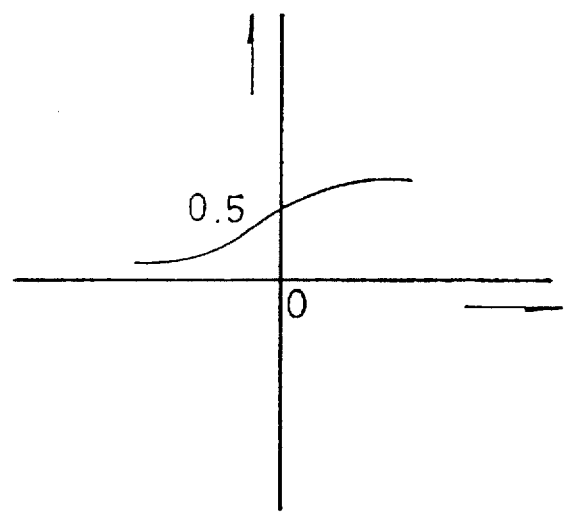
FIG. 12B is a graph of sigmoidal function.

FIG. 12B is a graph of the sigmoidal function. The backpropagation algorithm can be summarized as follows: First, a weight is set up. An input pattern is given together with desired output values. And then actual outputs are calculated. In order to minimize the error between the actual calculated outputs and the desired outputs, the weights are adjusted to be minimized.

The weights can be adjusted by:

$$W_{ij}(n+1) = W_{ij}(n) + \Delta W_{ij} \quad (9)$$

where, $W_{ij}$ is an weight between the present layer j and the former layer i, $W_{ij}(n+1)$ is a new weight between layers j and i, and $\Delta wij$ is an amount of variation after learning.

Equation 9 is induced as follows:

$$\text{Net } j = \Sigma ioj \, W_{ij} \quad (10)$$

where, Net j is a product of the outputs of the lower-most layer and the weights, 0j is an output of the j-th neuron, and if j is an input stage 0j becomes Ij.

The output 0j can be expressed by:

$$0j = f(\text{Net } j) \quad (11)$$

The f(Net j) is a sigmoidal function and can be written as:

$$f(\text{Net } j) = \frac{1}{1+e^{-(\text{Net } j+\theta j)}} \quad \text{(Equation 12)}$$

where,

θj is a threshold.

δj of the output layer can be expressed by:

$$\delta j = (Tj - Oj) f'(\text{Net } j) \quad (13)$$

$$f'(\text{Net } j) = f(\text{Net } j)(1 - f(\text{Net } j)) \quad (14)$$

where, Tj is desired output of j-th neuron, and 0j is the actual calculated output of j-th neuron.

And δj of hidden layer can be expressed by:

$$\delta j = f'(\text{Net } j) \sum_{k=1}^{m} (\delta K w_{jk}) \quad \text{(Equation 15)}$$

In Equation 15, m is the number of process unit of upper layer of a layer in which j is placed. Thus weight is adjusted by Equation 9.

That is $$W_{ij}(n+1) = W_{ij}(n) + \Delta W_{ij} \quad \text{(Eqation 9)}$$
$$= W_{ij}(n) + \eta \delta j O j \quad \text{(Equation 16)}$$

η is a rate of learning, and can be defined as 0<η<1. The larger is η the greater is the variation of weight. However, η is commonly selected from a range of 0.1<η<0.75 because the overall neural network may become unstable when η is greater than 0.75. Within such a range, the rate of learning becomes rapid as η is larger.

When the net error between the actual outputs and desired outputs is optimized to be minimum by adjusting weight values in the above-described manner, input patterns and desired outputs are given again and another pattern is subjected to a learning process. In order to make a convergency rate to be more speedy, momentum terms or bias terms may be added.

Figure 12C:
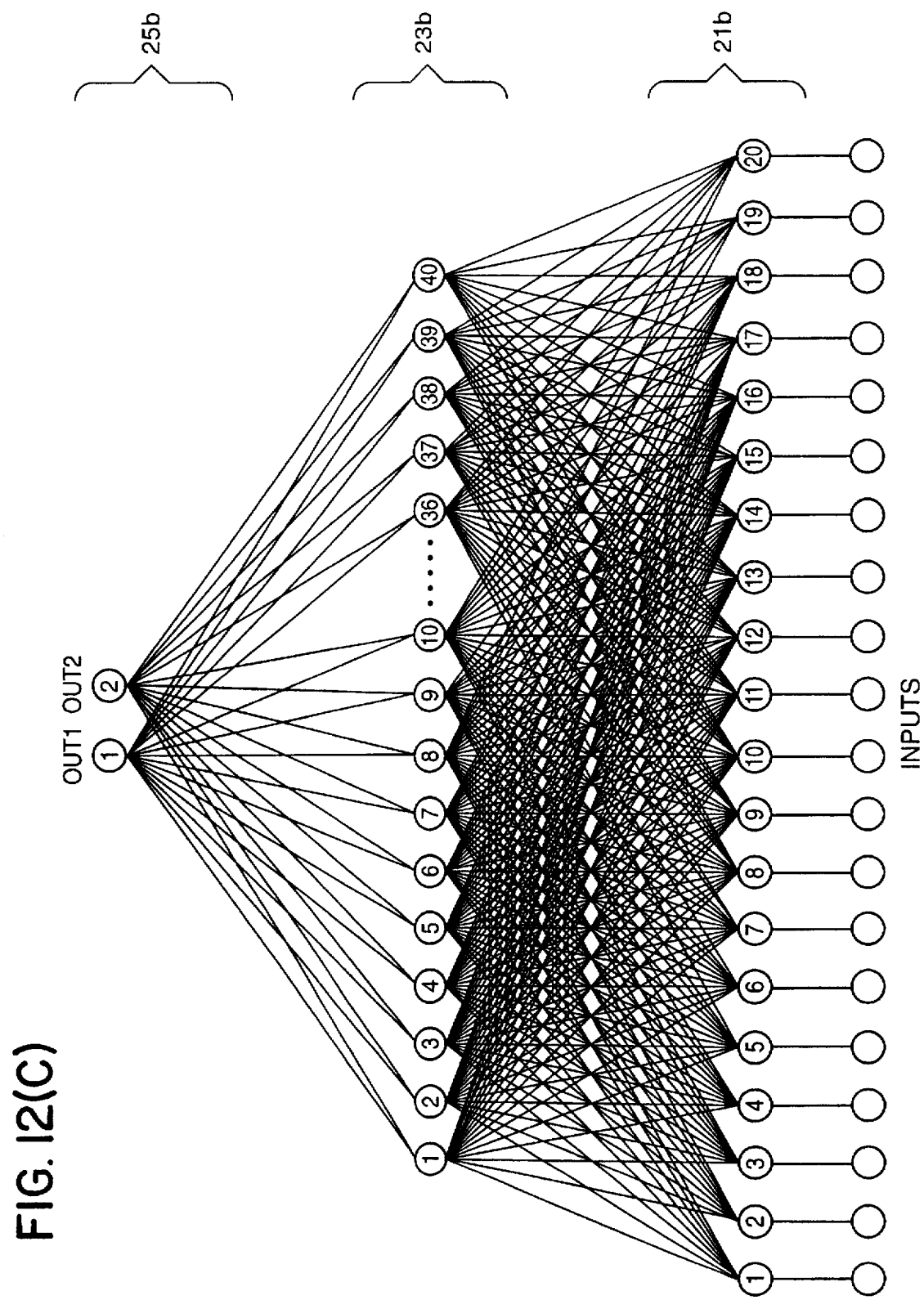
FIG. 12C shows a structure of the neural network according to the present invention.

FIG. 12C shows the structure of a neural network according to the present invention.

In one embodiment of the present invention, the number of data for input is eighteen when a sine wave of 60 Hz is applied for 150 msec. Accordingly, 20 input electrodes 21b are established in consideration of two extra electrodes. The electrodes of hidden layers 23b are forty, which is twice of the number of the input electrodes and is empirically determined. Two electrodes are established as output 25b. When the values of the two outputs are '11', the welding state is set to be 'over welded', when the values are '00', the welding state is set to be 'under welded', and when the values are '10', the welding state is set to be 'standard welding'.

Although three states are defined in one embodiment of the present invention, the number of the welding states can be increased or decreased as necessary. The software system is so structured that the numbers of electrodes of the input layer, hidden layer and output layer can be adjusted in accordance with the variation of setting conditions of the spot welding machine.

The above-described neural network monitoring system can be utilized in the waveform inspector which is for grouping the patterns of the welding voltages by using as inputs the voltage waveforms of FIG. 3 or utilized in the waveform inspector, which can classify the patterns of the electrode movement by using as inputs the voltage waveforms of FIG. 7.

FIG. 13 is a flow chart of the operation of the neural network monitoring system used in the present invention. The neural network monitoring system comprises a learning part 51 for learning the welding states, and an output generation part 53 for actual inspection after the learning. A selection of the learning part and the output generation part is performed in program software. The monitoring system is designed to use a pointer which can select the number of input layers and output layers so that the other pattern of learning and inspection can be applied. The learning method of the preferred embodiment of the present invention is a backpropagation.

First, an explanation of the learning part 51 will be given.

The first step 55 is setting up the structure of the neural network, at which the number of input and output electrodes by a program and the learning rate (η), and momentum rate are determined. Then, data and weight are initialized, and data are read for learning in steps 57 and 59. In these stages, the beginning of completely new learning may be chosen or subsequent learning with adding previous weights of foregoing learning may be selected. Data can be read out from the file stored in step 45 of FIG. 10.

Next is step 61 for calculating actual outputs of the multi-layered perceptron in order to carry out the learning of the neural network. The actual outputs for respective data sets are calculated by using the data file generated in step 45 of FIG. 11.

In step 63, weights are modified and adjusted by utilizing the errors between the desired outputs and the actual outputs calculated in step 61. The modification of weight is consistently performed until the learning is stopped when the errors are within a predetermined range through step 65 for checking the error limit.

When the learning is over, the modified weight value should be saved to be used in the output generation process.

The saved data is transformed into a file in step 67. Through this learning procedure, a standard waveform pattern can be recognized with respect to each of the standard, under welded and over welded cases. At this time, the learning is carried out off-line.

The term "off-line" is used, because data, or standard, under and over welded states are obtained by destructive inspection, when each welding is finished, and the learning of the neural network is accomplished by using the data and by determining weight. The voltage waveforms for each case are saved in the computer system according to the flow shown in FIG. 11.

The learning data of the neural network system are obtained and collected through repeated experiments by changing the current, the compression force or contacting surface of the welding tip. Among the obtained waveforms, proper bounds in which the welding is best performed are determined and the standard waveform is set. Then the features of under welding and over welding are determined so as to teach the neural network.

Now will be explained the output generation part 53. The initial step 71 of the neural network makes use of data regarding the structure data of the neural network stored in the learning process. In step 73, weight values modified by the learning are read from the saved file in order to provide for an inspection by the neural network.

The next step 75 is activating the A/D board according to the flow of FIG. 11 to provide for reading the digitalized voltage waveform. Inputs from the activated A/D board, which consists of max and min voltage values, are read in step 77. After then actual data are generated, in step 79, by the voltage signal data processed in the above described steps. The results and causes of comparison of the actual data with desired data are displayed as the welding state in step 81. When the welding state is poor, the inspection is stopped. If the welding is acceptable and good, the progress is return to step 77 and inputs are read and the inspection goes on.

The output generation part works at the same time as the welding job, leading to on-line inspection. If the inspection or monitoring is carried out under a condition similar to that of the learning process, the inspection operation can be repeatedly performed by using the weights determined through the learning operation, without doing over again another learning operation.

FIG. 14 is a table of learning data according to one embodiment of the present invention. The learning data are used in off-line learning of the neural network which utilizes the backpropagation explained above with reference to FIG. 13. Data sets 1,2,3 represent that the welding state is standard, data sets 4,5,6 show the under-welded state, and over-welded state is designated by data sets 7,8,9. The values of output electrode representing the welding states are set, at the same time of the welding operation, to correspond each of the data sets. In one embodiment of the present invention, the output node values are respectively '10', '00', and '11' which correspond to data sets for [1,2,3], [4,5,6], and [7,8,9]. Each of the data sets are input to the neural network, and by comparing these data sets with desired output ('11', '00', or '10') weights can be properly adjusted.

When the rates of learning and of momentum are all given by 0.5, the error is 0.001 in 1500 learning cycles and the learning takes about 6 minutes with a 486DX-2 computer system. The values of rates of the learning and of momentum are constant through the below-explained other embodiments of this invention.

When the learning is completed, the inspection of the monitoring system is performed on-line. The time taken in monitoring a single welding point is about 20 msec, which enables real time inspection. The learning-over neural network employs an A/D converting system for receiving a continuous voltage waveform and uses a computer system for analyzing the converted voltage waveform data.

FIG. 15A is an AC voltage waveform of the first illustrative embodiment of the present invention. In the first embodiment, the spot welding machine is a 19V-SCF spot welding machine which is developed by Orion Electric Co., Korea, and used in welding a frame of a TV CRT (Cathode Ray Tube). The welding machine is set at 6-3-10 cycles. The welding objects (i.e., base metals) are either 1.0 t bimetals available from Toshiba Co., Japan or surface coated 1.2 t SPC1 frames produced by Pohang Iron Manufacturing Co., Korea.

An applied voltage waveform consisting of three continuous AC waveforms as shown in FIG. 15A reveals that impurities which are from the surface coating process, exist on the surface of the base metals.

The first period corresponding to 6 cycles is a preliminary current for burning the coating of the welding area when the base metal has been coated. The active welding current is supplied in 10 cycles after 3 cycles of cooling period. Accordingly, the welding inspection only uses the voltage waveform corresponding to the 10 cycles.

FIG. 15B is a table of standard data according to the first embodiment of the present invention, which shows the influence of the current variation on the welding state. The standard data are obtained by the off-line learning using a backpropagation algorithm, which follows the flow chart of the learning part 51 as shown in FIG. 13. In the table of FIG. 14B, data series '1,2' represents a standard welding state, while series '3,4,5' represents an under welded state. In the first embodiment, the current of the standard welding state is 4100 A and the under welded current is 3000 A.

Figure 15C:
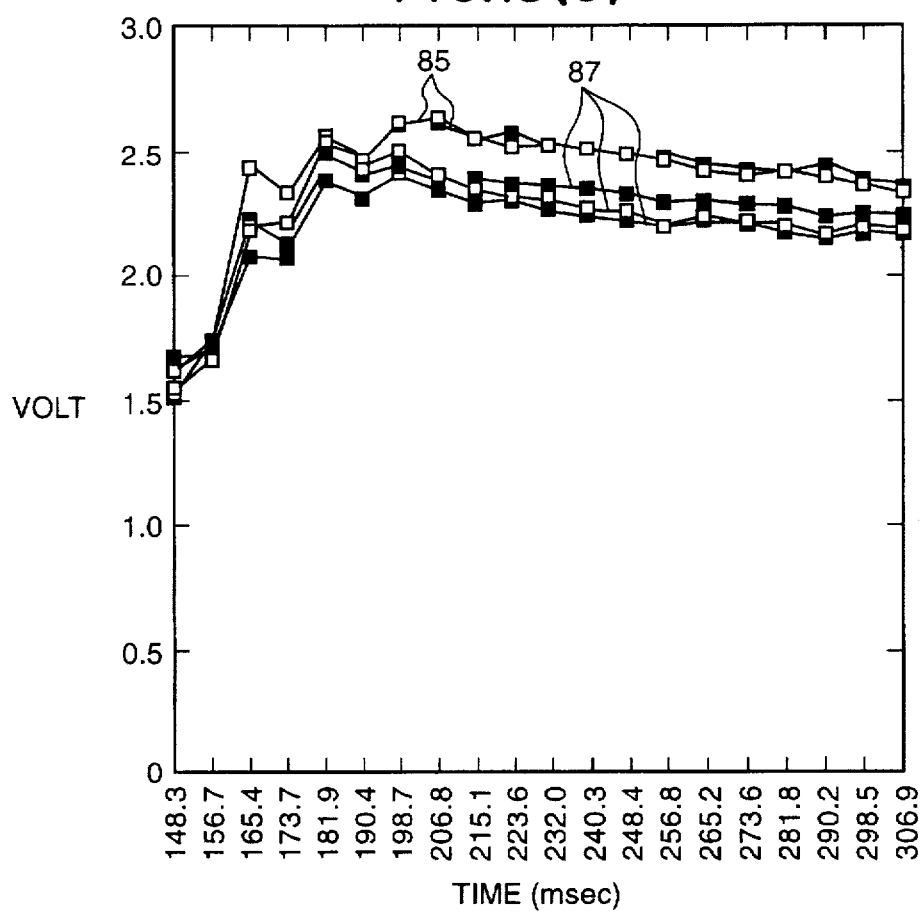
FIG. 15C is a voltage waveform used in the welding inspection of the first embodiment of the present invention.

FIG. 15C is a voltage waveform used in the welding inspection of the first embodiment of the present invention, which is plotted by making use of the data of FIG. 15B. Referring to FIG. 15C, the waveform 85 represents the standard welding state and the waveform 87 is related to the low current state.

Figure 15D:
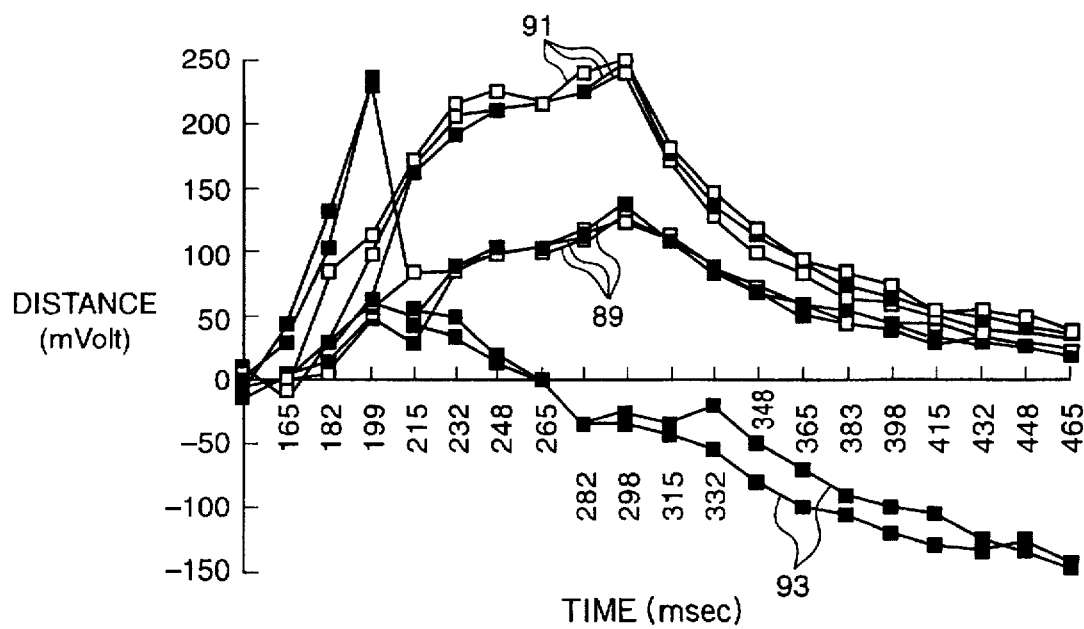
FIG. 15D is an electrode movement pattern used in the inspection of the first embodiment of the present invention.

FIG. 15D is an electrode movement pattern used in the inspection of the first embodiment of the present invention. The three waveforms 89, 91 and 93 correspond to electrode movement patterns of a low current (3000 A), a standard current (4100 A), and a high current (5000 A), respectively.

FIG. 16A is an AC voltage waveform of the second illustrative embodiment of the present invention. In the second embodiment, the spot welding machine is a SP5361-CH spot welding machine which is developed by Orion Electric Co., Korea. The welding machine is set to 9 cycles. The welding objects (i.e., base metals) are either 0.76 t bimetals available from Toshiba Co., Japan or 0.65 t SVS 304 frames of Poong-San Metal Co., Korea.

FIG. 16B is a table of standard data according to the second embodiment of the present invention. Data sets 1,2 correspond to a case of good welding state under standard pressure, while data sets 3,4, and data sets 5,6 represent an under welded state under high pressure and an over welded state under low pressure, respectively. In the second embodiment, the standard pressure is 4 $Kg/m^2$, the low pressure is 3 $Kg/m^2$, and the high pressure is 5 $Kg/M^2$.

The data of FIG. 16B can be obtained by performing a destructive direct inspection after every welding operation, and by extracting samples to the standard welding, the under and over welded states. At this time, the voltage waveforms during welding operation corresponding to each of three welding states are saved into a computer system simutaneously with the welding process. The voltage waveforms corresponding to each of the extracted samples are the desired output which is used in the learning of the neural network.

The desired output is compared with the calculated output which results from reading out of the voltage values corresponding to each of the states as shown in the learning part 51 of FIG. 7. After comparison of the desired output with the calculated output, weights are so controlled that the difference of two outputs is within a predetermined limit.

Figure 16C:
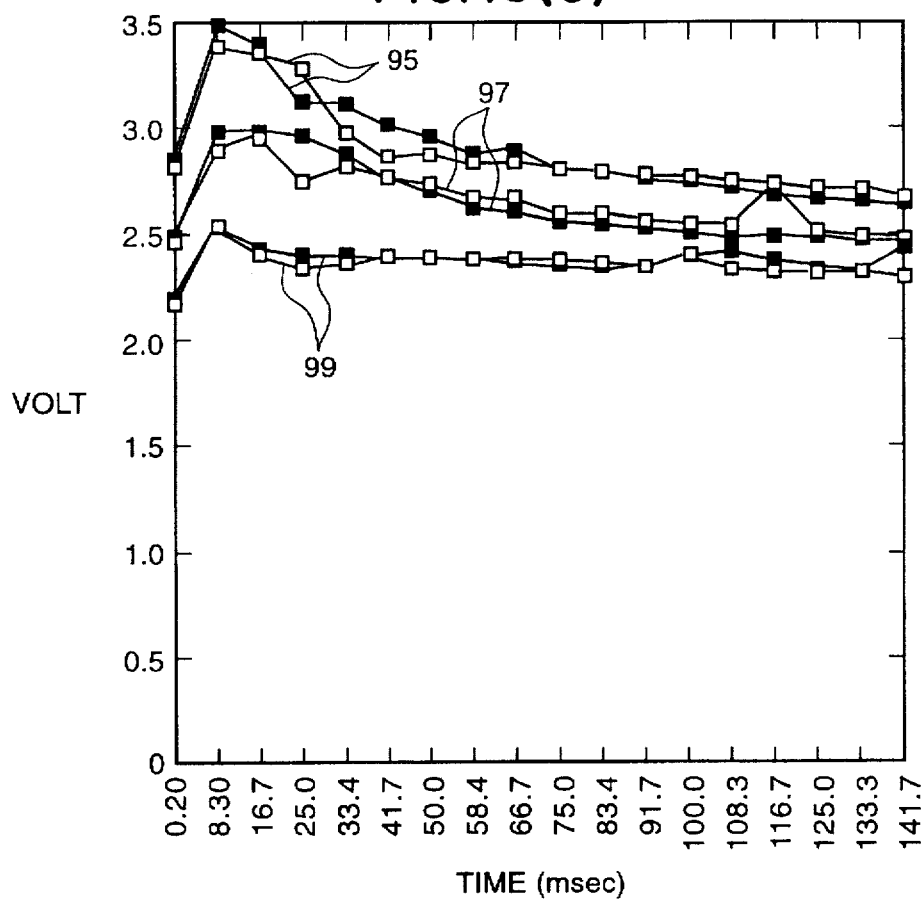
FIG. 16C is voltage waveform for a welding inspection according to the second embodiment of the present invention, which is plotted by making use of data of FIG. 16B.

FIG. 16C shows voltage waveforms for a welding inspection according to the second embodiment of the present invention, which is plotted by making use of the data of FIG. 16B. As apparent from FIG. 16C, the voltage is high at the first stage of the welding, and gradually decreases as the welding progresses when a waveform 97 corresponding to a standard welding state is considered. In the case of under welded state represented by a waveform 99, the voltage maintains low values without showing significant variation, and an over welded state of a waveform 95 shows, as a whole, high values since the gradient of the waveform is greater than that of the standard welding state.

Figure 16D:
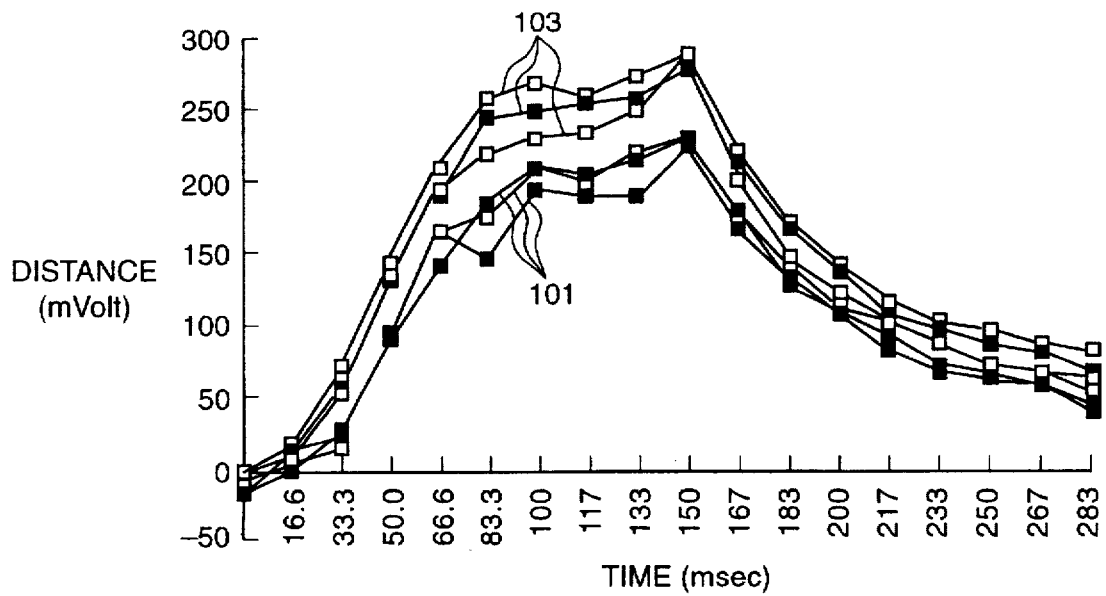
FIG. 16D is an electrode movement pattern used in the inspection of the second embodiment of the present invention.

FIG. 16D is an electrode movement pattern used in the inspection of the second embodiment of the present invention, of which waveforms 101 and 103 correspond to electrode movement patterns under standard pressure and under low pressure, respectively.

Figure 17A:
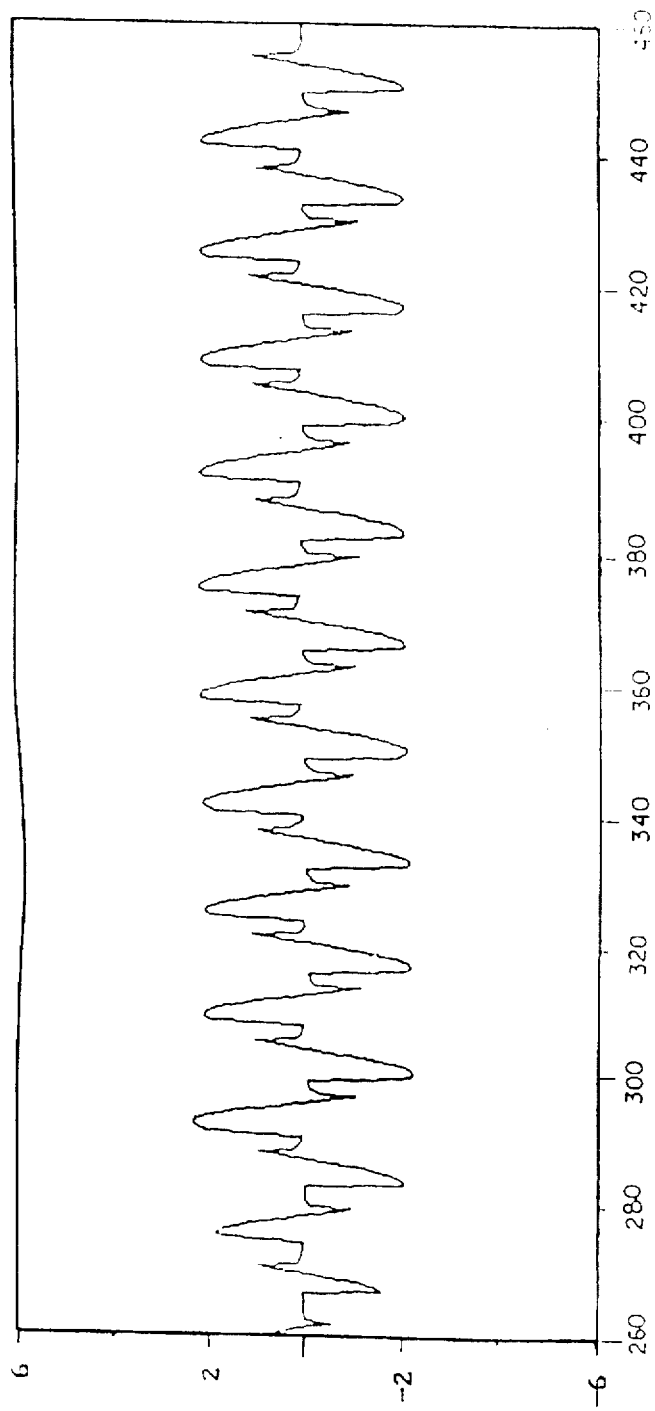
FIG. 17A is an AC voltage waveform according to another embodiment of the present invention.

FIG. 17A is an AC voltage waveform according to another embodiment of the present invention. In this embodiment, the spot welding machine is a 20V-CF spot welding machine which has been developed by Orion Electric Co., Korea. The welding machine is set at 12-4-12 cycles. The welding objects (i.e., base metals) are either 1.0 t bimetals available from Toshiba Co., Japan or 0.8t SPC1 frames produced by Pohang Iron Manufacturing Co., Korea. In FIG. 16A, only the last 12 cycles are shown, which is related to the actual welding current among the 12-4-12 cycles.

FIG. 17B is a table of standard data according to the above described embodiment of the present invention. In the table, data sets 1,2 represent a standard welding state, the diameter of the tip of the welding electrode is 5 mm($\phi$5), and the current is within a range from 3700 to 4100 A. The data sets 3,4 relate to a low current state of 2500 A current, while data sets 7,8 relate to high current state of over 5000 A current. Data sets 5,6 correspond to a case where the diameter of the tip of the welding electrode grows to be e.g., 6 mm($\phi$6).

Figure 17C:
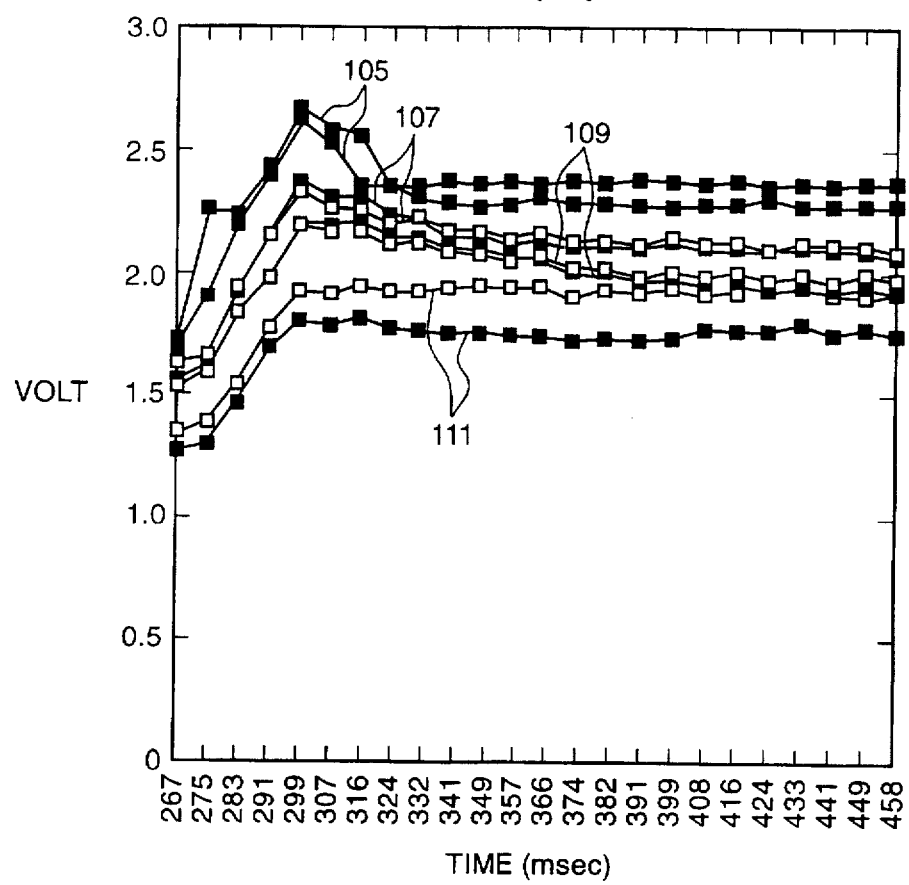
FIG. 17C is a voltage waveform used in the inspection according to the another embodiment of the present invention, which is plotted by making use of data in FIG. 17B.

FIG. 17C is a voltage waveform used in the inspection according to the embodiment of the present invention, which is plotted by making use of the data of FIG. 17B. In FIG. 17C, waveforms 105, 107, 109 and 111 are related to the states of high current, standard, wider contacting area of the tip of the welding electrode, and low current, respectively.

Figure 17D:
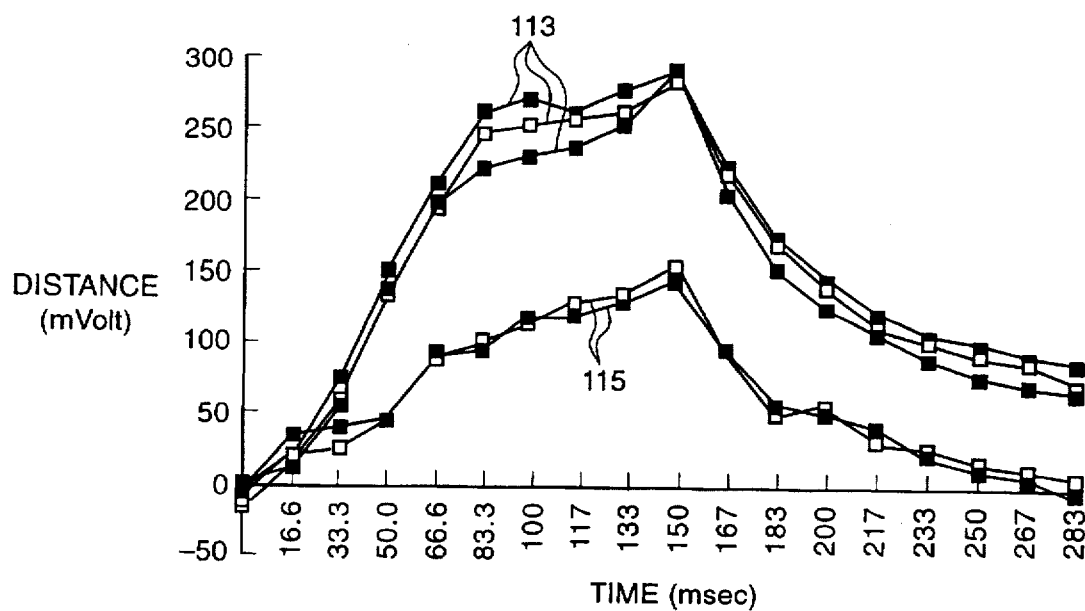
FIG. 17D is an electrode movement pattern used in the inspection according to the another embodiment of the present invention.

FIG. 17D is an electrode movement pattern used in the inspection according to the embodiment of the present invention, of which a waveform 113 represents a standard welding state, and a waveform 115 corresponds to a case where the contacting area of the welding electrode tip becomes wider.

As apparent from the above description, the welding state is influenced by the initial condition and abrupt variation of the welding machine itself. In particular, abrupt environmental change such as variations of current or compression force, difference of contacting area due to a continuous use of the welding electrode are major causes of failure of electric resistance welding.

The variation of the welding state resulting from the variation of the applied current and compression force can be easily detected by the voltage waveform measurement. However, in case of the difference of contacting area of welding electrodes, it is difficult to identify the features of the voltage waveforms, because increase of the contacting area results in two conflicting effects i.e., increase of contact resistance due to the variation of pressure per unit area, and decrease of resistance due to the increase of the contacting area.

On the other hand, the electrode movement pattern has an excellent property to determine the welding state, however the characteristic curve is so simple that the cause of the failure can not be easily detected when the welding has failed.

Accordingly, by simultaneously analyzing both the voltage waveform and the electrode movement pattern, it is possible to realize an inspection apparatus which can determine whether the welding operation has failed, and can detect the cause of failure of the welding so as to correct the failure on spot.

When the outputs of the neural network comprising the voltage waveform monitoring system and the electrode movement pattern monitoring system as shown in FIG. 8 are analyzed, the following table presents the results in tabular form.

| voltage waveform inspection | electrode movement pattern | welding state | causes |
| --- | --- | --- | --- |
| 1 | 10 | standard welding | low pressure, large tip area |
| 1 | 0 | under welded | low pressure, large tip area |
| 10 | 1 | over welded | small tip area |
| 10 | 10 | standard welding | proper condition |
| 10 | 0 | under welded | large tip area |
| 0 | 1 | over welded | high pressure, small tip area |
| 0 | 10 | standard welding | high pressure, small tip area |
| 0 | 0 | under welded | high pressure |

In the table, if the output of the neural network which has input data of outputs from the voltage waveform monitoring system is '11', the state is over welded state. And, when the output is '00' or '10', the state is under welded or standard welding state, respectively. On the other hand, when the output of the neural network which has input data of outputs from the electrode movement pattern monitoring system is '11', '10' or '00', the state is, respectively, over welded, standard welding, or under welded states.

It can be seen from the above description that a decrease of the applied current and an increase of pressure causes high voltage resulting from the under welded state, and that an increase of the contacting area of the welding electrode tip is represented by a decrease of electrode movement, leading to an under welded state.

As will be understood from the foregoing description, the on-line nondestructive inspection apparatus and method thereof is realized by utilizing the differences between voltage waveforms and electrode movement patterns of normal and abnormal welding states, which is conceived upon the fact that welding voltage goes down because contact resistance of the welding object is decrease as the welding is progressed, and that the distance of the welding electrode varies upon the advance step of the welding operation.

As a result, instant and simultaneous inspection of the welding state is possible, and the causes of welding failures can be detected and corrected at the same time as the welding operation.

Although the present invention has been described in connection with a spot welding machine, it will be apparent to those skilled in the art that other welding methods using electric resistance heat can utilize the preferred embodiments of the present invention without departing from the spirit and scope of the present invention.

What we claim is:

1. An on-line nondestructive inspecting apparatus for electric resistance welding, comprising:

an electric resistance welding machine having a first electrode connected to a higher voltage electrical potential terminal of a power source, a second electrode connected to a lower voltage electrical potential terminal of said power source, said first and second electrodes being arranged to have at least two welding objects interposed therebetween;

a voltage waveform measuring system including a noise filtering means and a first analog-to-digital converter; said noise filter means being arranged for transferring the voltage applied to the welding objects and a low frequency band pass filter to said first analog-to-digital converter; said voltage waveform measuring system being arranged for providing a voltage waveform measurement output;

an electrode movement measuring system including a sensing means, a second analog-to-digital converter and a digital filter; said sensing means being arranged for detecting variation of a gap between said first and second electrodes during said electric resistance welding and providing an output; said second analog-to-digital converter being arranged for transferring said output of said sensing means to said digital filter; said electrode movement measuring system being arranged for providing an electrode movement measurement output; and a neural network inspection system arranged for receiving said outputs of said voltage waveform measuring system and said electrode movement measuring system, comprising a multilayered neural network having an input layer, at least one hidden layer, and an output layer; said at least one hidden layer being interposed between said input and output layers; said neural network being arranged for said neural network inspection system to learn offline; and a computer system serving said neural network inspection system, said computer system comprising first software for converting signals digitalized by said first analog-to-digital converter to absolute value signals, and for detecting variations of peak value of said absolute value signals;

said neural network being arranged for using learning data acquired from off line destructive testing of spot welds made by said electric resistance welding machine, correlated with measurements of decrease in welding voltage as contact resistance of the welding objects welded in a learning stage decreases and the gap between the first and second electrodes increases, as welding progresses, and storing said learning data in said computer system; and said neural network inspection system being arranged for using said learning data, and said variations in peak value and said electrode movement measurement output, for providing a real time determination of integrity of welding being performed by use of said electric resistance welding machine.

2. The apparatus as claimed in claim 1, wherein:

said hidden layer has twice as many nodes as said input layer.

3. The apparatus as claimed in claim 1, wherein:

said sensing means comprises a non-contact-type optical sensor.

4. The apparatus as claimed in claim 1, wherein:

said neural network is further arranged for using learning data as to welding conditions including welding time, kinds of welding machine, and thickness of welding objects, previously stored in said computer system, to learn.

5. The apparatus as claimed in claim 1, wherein said computer system further comprises:

second software for eliminating noise and vibration from the signals digitalized and filtered through said second analog-to-digital converter and said filtering means, by use of a moving average method, for obtaining data with a sampling time corresponding to the wavelength of welding frequency.

6. A method for inspecting and performing an electric resistance welding state, comprising an off-line learning process and an inspecting process, said off-line learning process including:

(a) a first step comprising the sub-steps of (i) applying a voltage signal to both ends of each of at least two welding objects through first and second welding electrodes, and thereby combining the welding objects; (ii) converting said voltage signal into digital data; (iii) detecting variations of peak values of said digital data; and (iv) storing said detected variations in a computer system;

(b) a second step comprising monitoring the welding state of said welding objects with a destructive inspecting method; and (c) a third step comprising the sub-steps of (i) repeating said first and second steps; (ii) applying actual output data and predetermined output data to a neural network contained in said computer system, said actual output data representing variations of said peak values, and said desired output data corresponding to respective welding states; and (iii) determining weight values of the neural network by using a back propagation algorithm; and said inspecting process including:

(d) applying said variations detected in said first step to said neural network having the weight values determined in sub-step (iii) of said third step; and (e) performing an on-line inspection of the welding states of the welded objects;

said inspecting process being repeatedly performed by using weight values determined in said off-line learning process with conditions of said off-line learning process and said inspection process being identically set;

said computer system comprising first software for converting signals digitized by first analog-to-digital convertor to absolute value signals and for detecting variations of peak value of said absolute value signals;

said neural network being arranged for using learning data acquired from off line destructive of spot welds made by electric welding machine correlated with measurements of decrease in welding voltage as contact resistance of the welding objects welded in a learning stage decreases and the gap between the first and second electrode increases, as welding progresses and storing said learning data in said computer system; and said neural network inspection system being arranged for using said learning data and said variations in peak value and electrode movement measurement output for providing a real time determination of integrity of welding being performed by use of said electric welding machine.

* * * * *